(12) United States Patent
Clegg

(10) Patent No.: US 12,235,403 B2
(45) Date of Patent: *Feb. 25, 2025

(54) DETERMINING RESONANT FREQUENCIES AND MAGNETIC INFLUENCE FACTORS OF MATERIALS IN THE EARTH

(71) Applicant: Terrasee Tech, LLC, South Jordan, UT (US)

(72) Inventor: Philip Clegg, South Jordan, UT (US)

(73) Assignee: Terrasee Tech, LLC, South Jordan, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 18/213,020

(22) Filed: Jun. 22, 2023

(65) Prior Publication Data

US 2023/0350092 A1 Nov. 2, 2023

Related U.S. Application Data

(63) Continuation of application No. 17/843,901, filed on Jun. 17, 2022, now Pat. No. 11,726,227.

(Continued)

(51) Int. Cl.
*G01V 3/14* (2006.01)
*G01B 7/26* (2006.01)
(Continued)

(52) U.S. Cl.
CPC .............. *G01V 3/14* (2013.01); *G01B 7/26* (2013.01); *G01V 3/10* (2013.01); *G01V 3/38* (2013.01)

(58) Field of Classification Search
CPC .......... G01B 7/26; G01S 13/885; G01V 3/10; G01V 3/14; G01V 3/38
See application file for complete search history.

(56) References Cited

U.S. PATENT DOCUMENTS 3,019,383 A 1/1962 Varian
3,617,867 A 11/1971 Herzog
(Continued)

FOREIGN PATENT DOCUMENTS

BR P10606711-5 A2 3/2010
CA 2388981 A1 12/2002
(Continued)

OTHER PUBLICATIONS

U.S. Appl. No. 18/139,869, filed Apr. 26, 2023, Non-Final Office Action mailed Jan. 3, 2024, pp. 1-42.

*Primary Examiner* — Jay Patidar
(74) *Attorney, Agent, or Firm* — Kunzler Bean & Adamson; Bruce R. Needham

(57) ABSTRACT

A method includes determining a current magnetic field strength at a test location above a quantity of material buried at the test location, passing a direct current through a coil of an antenna to induce a magnetic polarity within a range with the determined magnetic field strength, transmitting a test signal with a fundamental frequency from an antenna at the test location, and detecting, at the test location, a reflected wave comprising the test fundamental frequency on the antenna. The method includes varying the test fundamental frequency while retransmitting the test signal and detecting a reflected wave until reflected waves of various test frequencies are detected and identifying from the detected reflected waves a resonant frequency corresponding to a maximum magnitude of the detected reflected waves. The material includes molecules with a resonant atom and at least one atom different than the resonant atom.

22 Claims, 14 Drawing Sheets

Related U.S. Application Data

(60) Provisional application No. 63/212,590, filed on Jun. 18, 2021.

(51) Int. Cl.
*G01V 3/10* (2006.01)
*G01V 3/38* (2006.01)

(56) References Cited

U.S. PATENT DOCUMENTS

| | | | |
|---|---|---|---|
| 3,667,035 | A | 5/1972 | Slichter |
| 4,939,460 | A | 7/1990 | Patla et al. |
| 4,992,656 | A | 2/1991 | Clauser |
| 5,309,098 | A | 5/1994 | Coates et al. |
| 5,557,200 | A | 9/1996 | Coates |
| 5,962,781 | A | 10/1999 | Veryaskin |
| 6,628,119 | B1 | 9/2003 | Eidesmo et al. |
| 6,879,735 | B1 | 4/2005 | Portniaguine et al. |
| 7,026,814 | B2 | 4/2006 | Bordon et al. |
| 7,240,550 | B2 | 7/2007 | Raffalt |
| 7,324,899 | B2 | 1/2008 | Zhdanov |
| 7,550,969 | B2 | 6/2009 | Zhdanov |
| 7,714,573 | B2 | 5/2010 | Edwards |
| 8,264,224 | B2 | 9/2012 | Ahn |
| 8,497,678 | B2 | 7/2013 | Rudakov |
| 8,564,296 | B2 | 10/2013 | Zhdanov et al. |
| 8,624,969 | B2 | 1/2014 | Zhdanov |
| 9,020,205 | B2 | 4/2015 | Zhdanov et al. |
| 9,322,910 | B2 | 4/2016 | Zhdanov et al. |
| 9,395,465 | B2 | 7/2016 | Csutak |
| 9,507,044 | B2 | 11/2016 | Zhdanov |
| 9,542,359 | B2 | 1/2017 | Zhdanov et al. |
| 9,817,153 | B2 | 11/2017 | Liszicasz et al. |
| 9,945,917 | B2 | 4/2018 | Drake et al. |
| 9,964,653 | B2 | 5/2018 | Zhdanov |
| 10,242,126 | B2 | 3/2019 | Zhdanov |
| 10,267,943 | B2 | 4/2019 | Marsala et al. |
| 10,429,535 | B2 | 10/2019 | Heaton et al. |
| 10,874,903 | B2 | 12/2020 | Zhdanov et al. |
| 2004/0124842 | A1 | 7/2004 | Eidesmo et al. |
| 2010/0161231 | A1 | 6/2010 | Atila |
| 2010/0179762 | A1 | 7/2010 | Tabarovsky et al. |
| 2011/0144472 | A1 | 6/2011 | Zhdanov |
| 2011/0175603 | A1 | 7/2011 | Burtman et al. |
| 2013/0018588 | A1 | 1/2013 | Zhdanov et al. |
| 2013/0253874 | A1 | 9/2013 | Zhdanov |
| 2014/0129194 | A1 | 5/2014 | Zhdanov |
| 2015/0153470 | A1 | 6/2015 | Stove et al. |
| 2015/0260812 | A1 | 9/2015 | Drake et al. |
| 2016/0291191 | A1 | 10/2016 | Fukushima et al. |
| 2018/0052100 | A1 | 2/2018 | Babin et al. |
| 2019/0018164 | A1 | 1/2019 | Slocum et al. |
| 2019/0361141 | A1 | 11/2019 | Ellis et al. |
| 2020/0238133 | A1 | 7/2020 | Zhdanov et al. |

FOREIGN PATENT DOCUMENTS

| | | |
|---|---|---|
| CA | 2671434 C | 9/2016 |
| EP | 0921755 B1 | 12/2003 |
| JP | 10319135 A | 12/1998 |
| KR | 20200051209 A | 5/2020 |
| KR | 20210044614 A | 4/2021 |
| WO | 2000016249 A1 | 3/2000 |
| WO | 2005076042 A1 | 8/2005 |
| WO | 2015026650 A1 | 2/2015 |
| WO | 2017140323 A1 | 8/2017 |

| Description | Mineral | RA | L Hz/mg | Infl. Atm | MIF$_1$ | MIF$_2$ |
|---|---|---|---|---|---|---|
| Oil | C+H+ | C$^{13}$ | 1.07084 | C$^{13}$ | 989.78 | 968.60 |
| Oil | C+H+ | C$^{13}$ | 1.07084 | H | 828.74 | 828.74 |
| Oil | C+H+ | H | 4.25775 | C$^{13}$ | 1011.84 | 980.48 |
| Oil | C+H+ | H | 4.25775 | H | 828.74 | N/A |
| Quartz | SiO$_2$ | O$^{17}$ | 0.57742 | O$^{17}$ | 937.6 | N/A |
| Quartz | SiO$_2$ | O$^{17}$ | 0.57742 | Si | 1068.41 | N/A |
| Quartz | SiO$_2$ | Si | 0.84655 | O$^{17}$ | 958.89 | N/A |

| | RA | MIF Formula | MIF | L Hz/mg | RF | RV | RT/S | P/V F/M |
|---|---|---|---|---|---|---|---|---|
| 1 | $^{17}$O | -S+O | -130.81 | 0.57742 | 227.0 | 21.62 | 71 | 2.5 |
| 2 | $^{17}$O | -S | -1068.41 | 0.84655 | 314.4 | 21.62 | 71 | 2.5 |
| 3 | $^{29}$Si | -O | -958.89 | 4.25775 | 368.2 | 27.91 | 71 | 2.5 |
| 4 | $^{17}$O | +S-O | 130.81 | 0.57742 | 378.1 | 21.62 | 71 | 2.5 |
| 5 | $^{17}$O | -S-O | -2006.01 | 0.57742 | 855.7 | 21.62 | 71 | 2.5 |
| 6 | $^{17}$O | +S | 1068.41 | 0.57742 | 919.5 | 21.62 | 71 | 2.5 |
| 7 | $^{29}$Si | -2*O | -1917.78 | 0.84655 | 1179.9 | 27.91 | 71 | 2.5 |
| 8 | $^{29}$Si | +O | 958.89 | 0.84655 | 1255.3 | 27.91 | 71 | 2.5 |
| 9 | $^{17}$O | +S+O | 2006.01 | 0.57742 | 1460.9 | 21.62 | 71 | 2.5 |
| 10 | $^{29}$Si | +2*O | 1917.78 | 0.84655 | 2067.1 | 27.91 | 71 | 2.5 |

(Silicone Dioxide)

| Mineral | RA | L Hz/mg | Infl. Atom | MIF |
|---|---|---|---|---|
| SiO$_2$ | O$^{17}$ | 0.57742 | O$^{17}$ | 937.60 |
| SiO$_2$ | O$^{17}$ | 0.57742 | Si | 1068.41 |
| SiO$_2$ | Si | 0.84655 | O$^{17}$ | 958.89 |

| Earth B | 524.0 |
|---|---|

FIG. 13

DETERMINING RESONANT FREQUENCIES AND MAGNETIC INFLUENCE FACTORS OF MATERIALS IN THE EARTH

CROSS-REFERENCE TO RELATED APPLICATIONS

This is a continuation application of and claims priority to U.S. patent application Ser. No. 17/843,901 entitled "DETERMINING RESONANT FREQUENCIES AND MAGNETIC INFLUENCE FACTORS OF MATERIALS IN THE EARTH", filed on Jun. 17, 2022 for Philip Clegg, which claims the benefit of U.S. Provisional Patent Application No. 63/212,590 entitled "DETERMINING PRESENCE AND DEPTH OF MATERIALS IN THE EARTH" and filed on Jun. 18, 2021, for Philip Clegg, which is incorporated herein by reference.

FIELD

This invention relates to determining the presence and depth of materials in the earth and more particularly relates to mineral signature detection to determine the presence and depth of materials in the earth.

BACKGROUND

Many methods have been used over time to locate minerals and other materials below the earth's surface. For example, water detection below the earth for drilling water wells often requires drilling multiple test wells to map out underground aquafers for farming and providing water to cities, communities, etc. Oil exploration is very expensive and has often been inaccurate. Location of minerals/materials buried in the earth is extremely useful.

BRIEF SUMMARY

A method for determining depth of a material is disclosed. The method includes transmitting a signal from an antenna at a location. The signal includes a fundamental frequency and the signal penetrates ground under the location. The location is selected to locate a material at a depth under the location. The fundamental frequency matches a known resonant frequency of a resonant atom of a molecule of the material. The method includes detecting a reflected wave on the antenna, determining a time difference between transmission of the signal and detection of the reflected wave on the antenna, and determining the depth to the material based on the time difference and a reflected velocity corresponding to the resonant atom.

An apparatus for determining depth of a material includes a transmission circuit configured to transmit a signal from an antenna at a location. The signal includes a fundamental frequency and the signal penetrates ground under the location. The location is selected to locate a material at a depth under the location and the fundamental frequency matches a known resonant frequency of a resonant atom of a molecule of the material. The apparatus includes a wave detector configured to detect a reflected wave on the antenna, a timer configured to determine a time difference between transmission of the signal and detection of the reflected wave on the antenna, and a depth calculator configured to determine the depth to the material based on the time difference and a reflected velocity corresponding to the resonant atom.

A method for calculating a magnetic influence factor (MIF) between an atom and a resonant atom of a molecule of a material includes determining a current magnetic field strength at a test location above a quantity of material buried at the test location, transmitting a test signal from an antenna at the test location, the test signal comprising a test fundamental frequency, and detecting, at the test location, a reflected wave comprising the test fundamental frequency on the antenna. The method includes varying the test fundamental frequency while retransmitting the test signal and detecting a reflected wave until reflected waves of various test frequencies are detected and identifying from the detected reflected waves a resonant frequency corresponding to a maximum magnitude of the detected reflected waves. The material includes molecules with a resonant atom and at least one atom different than the resonant atom.

An apparatus for calculating a magnetic influence factor (MIF) between an atom and a resonant atom of a molecule of a material includes a magnetometer configured to determine a current magnetic field strength at a test location above a quantity of material buried at the test location, and a transmission circuit configured to transmit a test signal from an antenna at the test location. The test signal includes a test fundamental frequency. The apparatus includes a wave detector configured to detect, at the test location, a reflected wave comprising the test fundamental frequency on the antenna and a depth calculator configured to vary the test fundamental frequency while the transmission circuit retransmits the test signal and the wave detector detects a reflected wave until reflected waves of various test frequencies are detected, and a resonant frequency calculator is configured to identify from the detected reflected waves a resonant frequency corresponding to a maximum magnitude of the detected reflected waves. The material includes molecules with a resonant atom and at least one atom different than the resonant atom.

An antenna for determining a depth of a material includes a rod, a coil wound around the rod, and a DC current source configured to transmit a DC current in the coil. DC current in the coil induces an electromagnetic field with a particular polarity in the antenna and DC current in an opposite direction in the coil induces an electromagnetic field with an opposite polarity in the rod. The antenna includes a signal generator connected to the rod. The signal generator is configured to transmit a signal comprising a fundamental frequency to the rod. The antenna includes a transmission circuit configured to cause the signal generator to transmit the signal to the rod. The rod is positioned horizontally while transmitting the signal, where the fundamental frequency is a resonant frequency of a molecule of a material buried below a location where the antenna is located. The resonant frequency is correlated to a resonant atom of the molecule and one or more magnetic influence factors (MIF). Each MIF includes an amount of magnetic influence between the resonant atom and an atom of the molecule different from the resonant atom. The antenna includes a wave detector configured to detect a reflected wave. Detection of the reflected wave includes detecting a downward force on the rod above a threshold. The antenna includes a timer configured to measure a time difference between transmission of the signal and detection of the reflected wave, and a depth calculator configured to determine a depth of the material based on the time difference and a reflected velocity corresponding to the resonant atom.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 13 is a table illustrating magnetic influence factors and other information for various molecules of silicon dioxide, according to various embodiments;

DETAILED DESCRIPTION

Figure 1:
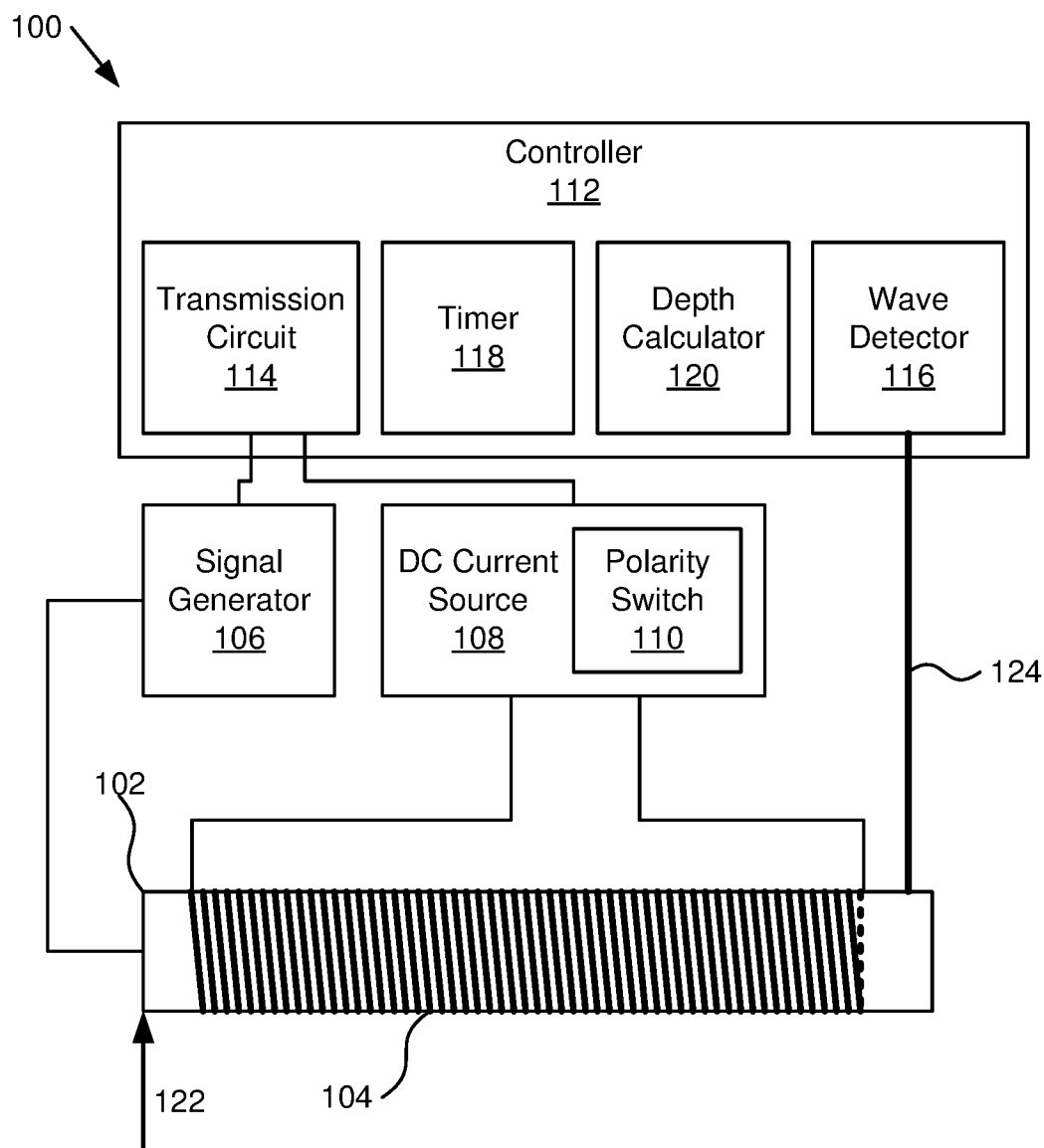
FIG. 1 is a schematic block diagram illustrating a locator apparatus for determining presence and depth of materials in the earth, according to various embodiments.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "system," "calculator," "detector," etc. Furthermore, aspects of the present invention may take the form of a computer program product embodied in one or more computer readable medium(s) having program code embodied thereon.

Many of the functional units described in this specification have been labeled as circuit, module, system, calculator, "detector, etc., in order to more particularly emphasize their implementation independence. For example, a circuit, module, system, calculator, detector, etc. may be implemented as a hardware circuit comprising custom very large scale integrated ("VLSI") circuits or gate arrays, off-the-shelf semiconductors such as logic chips, transistors, or other discrete components. A circuit, module, system, calculator, detector, etc. may also be implemented in programmable hardware devices such as a field programmable gate array ("FPGA"), programmable array logic, programmable logic devices or the like.

A portion or all of circuit, module, system, calculator, detector, etc. may also be implemented in software for execution by various types of processors. An identified circuit, module, system, calculator, detector, etc. with program code may, for instance, comprise one or more physical or logical blocks of computer instructions which may, for instance, be organized as an object, procedure, or function. Nevertheless, the executables of an identified circuit, module, system, calculator, detector, etc. need not be physically located together, but may comprise disparate instructions stored in different locations which, when joined logically together, comprise the circuit, module, system, calculator, detector, etc. and achieve the stated purpose for the circuit, module, system, calculator, detector, etc.

Where a circuit, module, system, calculator, detector, etc. or portions of a circuit, module, system, calculator, detector, etc. are implemented in software, the program code may be stored and/or propagated on in one or more computer readable medium(s). The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Many of the functional units described in this specification have been labeled as circuits, modules, calculators, detectors, etc., in order to more particularly emphasize their implementation independence. For example, a circuit, module, calculator, detector, etc. may be implemented as a hardware circuit comprising custom VLSI circuits or gate arrays, off-the-shelf semiconductors such as logic chips, transistors, or other discrete components. Circuits, modules, calculators, detectors, etc. may also be implemented in programmable hardware devices such as field programmable gate arrays, programmable array logic, programmable logic devices or the like.

A circuit, module, calculator, detector, etc. may also be implemented in software for execution by various types of processors. An identified circuit, module, calculator, detector, etc. of program instructions may, for instance, comprise one or more physical or logical blocks of computer instructions which may, for instance, be organized as an object, procedure, or function. Nevertheless, the executables of an identified circuit, module, calculator, detector, etc. need not be physically located together, but may comprise disparate instructions stored in different locations which, when joined logically together, comprise the circuit, module, calculator, detector, etc. and achieve the stated purpose for the circuit, module, calculator, detector, etc.

The schematic flowchart diagrams and/or schematic block diagrams in the Figures illustrate the architecture, functionality, and operation of possible implementations of apparatuses, systems, methods, and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

A method for determining depth of a material is disclosed. The method includes transmitting a signal from an antenna at a location. The signal includes a fundamental frequency and the signal penetrates ground under the location. The location is selected to locate a material at a depth under the location. The fundamental frequency matches a known resonant frequency of a resonant atom of a molecule of the material. The method includes detecting a reflected wave on the antenna, determining a time difference between transmission of the signal and detection of the reflected wave on the antenna, and determining the depth to the material based on the time difference and a reflected velocity corresponding to the resonant atom.

In some embodiments, the antenna is a first antenna set to a magnetic polarity and the signal is from the first antenna is a first signal. The time difference is a first time difference, the depth of the material is a depth to a top of the material, and the method includes, while transmitting the first signal by the first antenna, transmitting a second signal from a second antenna located a distance from the first antenna, where the second signal includes the fundamental frequency and the second antenna is set to an opposite magnetic polarity as the magnetic polarity of the first antenna, detecting a reflected wave on the second antenna, repeating, at varying distances from the first antenna, transmitting the second signal and detecting a reflected wave on the second signal to find an edge location where a reflected wave is not detected by the second antenna, transmitting the second signal from the second antenna at a signal detection location, and detecting a second reflected wave on the second antenna at the signal detection location. The signal detection location is located nearer the first antenna than the edge location and close to the edge location. In the embodiments, the method includes determining a second time difference between transmission of the second signal and detection of the second reflected wave on the second antenna, determining a second time difference between the first time difference and the second time difference, determining the depth of a bottom of the material based on the second time difference and the reflected velocity corresponding to the resonant atom, and determining a thickness of the material by subtracting the depth of the top of the material and the depth of the bottom of the material.

In some embodiments, the antenna includes a rod, a coil wound around the rod, a direct current ("DC") current source configured to transmit a DC current in the coil, where DC current in the coil induces a magnetic polarity in the antenna and DC current in an opposite direction in the coil induces an opposite magnetic polarity in the rod, and a signal generator connected to the rod. The signal generator is configured to transmit the fundamental frequency to the rod. The rod is positioned horizontally while transmitting the signal and detecting the reflected wave, and detecting the reflected wave includes detecting a downward force on the rod. In other embodiments, detecting the downward force includes detecting the downward force on a strain gauge connected to the rod above a threshold, and/or detecting movement of the rod in a downward direction includes detecting downward movement of the rod sufficient to overcome a spring force in an upward direction exerted by a spring mechanism supporting the rod.

In some embodiments, the known resonant frequency is calculated based on a resonant frequency equation:

$$RF=|(B+\Sigma MIF)(L)|$$

wherein:
RF is the resonant frequency;
B is a magnetic field strength at the location;
L is a Larmor Precessional Frequency of the resonant atom; and
$\Sigma MIF$ is a summation of magnetic influence factors of other atoms of the molecule of the material different from the resonant atom, wherein a magnetic influence factor (MIF) of an atom of the other atoms of the molecule comprises a magnetic influence of the atom with respect to the resonant atom.

In other embodiments, in response to not detecting the reflected wave on the antenna, the method includes adjusting the magnetic field strength B at the location to correspond to a depth below the location, changing the resonant frequency to an adjusted resonant frequency based on the resonant frequency equation and the adjusted magnetic field strength B for the depth below the location, transmitting an adjusted signal from the antenna at the location, the adjusted signal comprising an adjusted fundamental frequency, the adjusted fundamental frequency based on the adjusted resonant frequency, and attempting to detect a reflected wave on the antenna. In response to detecting the reflected wave on the antenna, determining a time difference between transmission of the adjusted signal and detection of the reflected wave on the antenna, and determining the depth to the material based on the time difference and a reflected velocity corresponding to the resonant atom. In response to not detecting the reflected wave on the antenna, further adjusting the magnetic field strength B at the location to another depth below the location. In the embodiments, the method includes repeating adjustment of the magnetic field strength B at the location to another depth until detecting the reflected wave on the antenna or exhausting a planned number of attempts at different depths below the location within a depth range.

In other embodiments, the ΣMIF is based on atoms of the molecule of the material located within two connections away from the resonant atom with respect to covalent bonds of a structure of atoms of the molecule. In other embodiments, the MIF of an atom of the other atoms is based on a magnetic spin with relation to a magnetic spin of the resonant atom. In other embodiments, the MIF between an atom of the molecule different from the resonant atom of the molecule of the material is determined by determining a current magnetic field strength at a test location above a quantity of the material, transmitting a test signal from the antenna at the test location, the test signal comprising a test fundamental frequency, detecting, at the test location, a reflected wave comprising the test fundamental frequency on the antenna, varying the test fundamental frequency while retransmitting the test signal and detecting a reflected wave until reflected waves of various test fundamental frequencies are detected and determining from the detected reflected waves a resonant frequency corresponding to a maximum magnitude of the detected reflected waves, and calculating the MIF between the different atom and the resonant atom of the molecule of the material using the determined magnetic field strength at the test location, a Larmor Precessional Frequency of the resonant atom, the resonant frequency corresponding to the maximum magnitude of the reflected wave, and the resonant frequency equation.

In other embodiments, the MIF and resonant frequency of a molecule of the material with a same nuclear spin for the resonant atom and the different atom differs from the MIF and resonant frequency of a molecule of the material with a nuclear spin of the resonant atom being opposite the nuclear spin of the different atom. In other embodiments, the method includes measuring the magnetic field strength at the location and using the measured magnetic field strength to determine the resonant frequency. In other embodiments, the known resonant frequency is calculated prior to transmitting the signal and is based on real time measurements of the magnetic field strength at the location and/or at a surface at the location or at a chosen depth below the location.

An apparatus for determining depth of a material includes a transmission circuit configured to transmit a signal from an antenna at a location. The signal includes a fundamental frequency and the signal penetrates ground under the location. The location is selected to locate a material at a depth under the location and the fundamental frequency matches a known resonant frequency of a resonant atom of a molecule of the material. The apparatus includes a wave detector configured to detect a reflected wave on the antenna, a timer configured to determine a time difference between transmission of the signal and detection of the reflected wave on the antenna, and a depth calculator configured to determine the depth to the material based on the time difference and a reflected velocity corresponding to the resonant atom.

In some embodiments, the transmission circuit is a first transmission circuit, the wave detector is a first wave detector, the timer is a first timer, the depth calculator is a first depth calculator, the antenna is a first antenna set to a magnetic polarity, the signal from the first antenna is a first signal, the time difference is a first time difference, the depth of the material is a depth to a top of the material, and the apparatus includes, while transmitting the first signal by the first antenna, a second transmission circuit configured to transmit a second signal from a second antenna located a distance from the first antenna, where the second signal includes the fundamental frequency and the second antenna set to an opposite magnetic polarity as the magnetic polarity of the first antenna, a second wave detector configured to detect a reflected wave on the second antenna, and the second transmission circuit is configured to repeat, at varying distances from the first antenna, transmitting the second signal and detecting a reflected wave on the second signal to find an edge location where a reflected wave is not detected by the second wave detector at the second antenna.

In the embodiments, the second transmission circuit is configured to transmit the second signal from the second antenna at a signal detection location, the second wave detector is configured to detect a second reflected wave on the second antenna at the signal detection location, where the signal detection location is located nearer the first antenna than the edge location and close to the edge location, a second timer is configured to determine a second time difference between transmission of the second signal and detection of the second reflected wave on the second antenna, a second depth calculator is configured to determine a second time difference between the first time difference and the second time difference, the second depth calculator is configured to determine the depth of a bottom of the material based on the second time difference and the reflected velocity corresponding to the resonant atom, and a thickness calculator is configured to determine a thickness of the material by subtracting the depth of the top of the material and the depth of the bottom of the material.

In some embodiments, the antenna includes a rod, a coil wound around the rod, a DC current source configured to transmit a DC current in the coil, where DC current in the coil induces a magnetic polarity in the antenna and DC current in an opposite direction in the coil induces an opposite magnetic polarity in the rod, and a signal generator connected to the rod, the signal generator configured to transmit the fundamental frequency to the rod. The rod is positioned horizontally while transmitting the signal and detecting the reflected wave, and detecting the reflected wave includes detecting a downward force on the rod. In some embodiments, the wave detector detecting the downward force includes detecting the downward force on a strain gauge connected to the rod above a threshold and/or detecting movement of the rod in a downward direction includes detecting downward movement of the rod sufficient to overcome a spring force in an upward direction exerted by a spring mechanism supporting the rod.

In some embodiments, the depth calculator is configured to calculate the known resonant frequency based on a resonant frequency equation:

$$RF=|(B+\Sigma MIF)(L)|$$

where RF is the resonant frequency, B is a magnetic field strength at the location, L is a Larmor Precessional Frequency of the resonant atom, and ΣMIF is a summation of magnetic influence factors of other atoms of the molecule of the material different from the resonant atom. A magnetic influence factor (MIF) of an atom of the other atoms of the molecule comprises a magnetic influence of the atom with respect to the resonant atom.

In some embodiments, in response to the depth calculator not detecting the reflected wave on the antenna, the apparatus includes a depth module configured to adjust the magnetic field strength B at the location to correspond to a depth below the location, and a resonant frequency change module configured to change the resonant frequency to an adjusted resonant frequency based on the resonant frequency equation and the adjusted magnetic field strength B for the depth below the location. In the embodiment, the transmission circuit is configured to transmit an adjusted signal from the antenna at the location. The adjusted signal includes an adjusted fundamental frequency and the adjusted fundamental frequency is based on the adjusted resonant frequency. In the embodiments, the wave detector is configured to attempt to detect a reflected wave on the antenna, and in response to detecting the reflected wave on the antenna, a timer configured to determine a time difference between transmission of the adjusted signal and detection of the reflected wave on the antenna, and the depth calculator is configured to determine the depth to the material based on the time difference and a reflected velocity corresponding to the resonant atom. In response to not detecting the reflected wave on the antenna, the depth module is further configured to adjust the magnetic field strength B at the location to another depth below the location, and the depth module is configured to repeat adjustment of the magnetic field strength B at the location to another depth until the wave detector detects the reflected wave on the antenna or exhausts a planned number of attempts at different depths below the location within a depth range.

In some embodiments, the ΣMIF is based on atoms of the molecule of the material located within two connections away from the resonant atom with respect to covalent bonds of a structure of atoms of the molecule. In other embodiments, the MIF of an atom of the other atoms is based on a magnetic spin with relation to a magnetic spin of the resonant atom.

In some embodiments, the MIF between an atom of the molecule different from the resonant atom of the molecule of the material is determined by a magnetometer configured to determine a current magnetic field strength at a test location above a quantity of the material, the transmission circuit is configured to transmit a test signal from the antenna at the test location, where the test signal includes a test fundamental frequency, the wave detector is configured to detect, at the test location, a reflected wave comprising the test fundamental frequency on the antenna, the depth calculator is configured to vary the test fundamental frequency while retransmitting the test signal and the wave detector is configured to detect a reflected wave until reflected waves of various test fundamental frequencies are detected and the apparatus includes a resonant frequency calculator configured to determine from the detected reflected waves a resonant frequency corresponding to a maximum magnitude of the detected reflected waves. An MIF module is configured to calculate the MIF between the different atom and the resonant atom of the molecule of the material using the determined magnetic field strength at the test location, a Larmor Precessional Frequency of the resonant atom, the resonant frequency corresponding to the maximum magnitude of the reflected wave, and the resonant frequency equation.

In some embodiments, the MIF and resonant frequency of a molecule of the material with a same nuclear spin for the resonant atom and the different atom differs from the MIF and resonant frequency of a molecule of the material with a nuclear spin of the resonant atom being opposite the nuclear spin of the different atom. In other embodiments, the apparatus includes a magnetometer configured to measure the magnetic field strength at the location and using the measured magnetic field strength to determine the resonant frequency. In other embodiments, the known resonant frequency is calculated prior to transmitting the signal and is based on real time measurements of the magnetic field strength at the location and/or at a surface at the location or at a chosen depth below the location.

A method for calculating a magnetic influence factor (MIF) between an atom and a resonant atom of a molecule of a material includes determining a current magnetic field strength at a test location above a quantity of material buried at the test location, transmitting a test signal from an antenna at the test location, the test signal comprising a test fundamental frequency, and detecting, at the test location, a reflected wave comprising the test fundamental frequency on the antenna. The method includes varying the test fundamental frequency while retransmitting the test signal and detecting a reflected wave until reflected waves of various test frequencies are detected and identifying from the detected reflected waves a resonant frequency corresponding to a maximum magnitude of the detected reflected waves.

In some embodiments, an equation for the resonant frequency is:

$$RF = |(B + \Sigma MIF)(L)|$$

wherein:
RF is the resonant frequency;
B is a magnetic field strength at the test location; and
L is a Larmor Precessional Frequency of the resonant atom.

In other embodiments, the material includes molecules with a resonant atom and at least one atom different than the resonant atom, and the resonant frequency corresponds to magnetic influence factor (MIF) between the different atom and the resonant atom of the molecule of the material and the method includes calculating the MIF between the different atom and the resonant atom using the determined magnetic field strength at the test location, a Larmor Precessional Frequency of the resonant atom, the resonant frequency corresponding to the maximum magnitude of the reflected wave, and a resonant frequency equation. In other embodiments, in response to determining a MIF for each atom of the molecule different than the resonant atom, the method includes transmitting a second test signal from the antenna at the test location. The second test signal includes a second test fundamental frequency corresponding to a combination of two or more atoms and/or magnetic spins of the two or more atoms of the molecule of the material different than the combination of two or more atoms and/or magnetic spins of the two or more atoms assumed for determining a first resonant frequency.

In the embodiments, the method includes detecting, at the test location, a reflected wave comprising the second test fundamental frequency on the antenna, and varying the second test fundamental frequency while retransmitting the second test signal and detecting a reflected wave until reflected waves of various second test fundamental frequencies are detected and identifying from the detected reflected waves a resonant frequency corresponding to a maximum magnitude of the detected reflected waves. The resonant frequency corresponds to a summed magnetic influence factor (ΣMIF) between the different atoms and the resonant atom of the molecule of the material. In the embodiments, the method includes calculating the ΣMIF between the different atoms and the resonant atom using the determined magnetic field strength at the test location, a Larmor Precessional Frequency of the resonant atom, the resonant frequency corresponding to the maximum magnitude of the reflected wave, where each MIF for each atom of the molecule is different than the resonant atom, and a resonant frequency equation:

$$RF=|(B+\Sigma MIF)(L)|$$

wherein ΣMIF is a summation of magnetic influence factors of the atoms of the molecule of the material different from the resonant atom.

In some embodiments, the antenna includes a rod, a coil wound around the rod, a DC current source configured to transmit a DC current in the coil, where DC current in the coil induces a magnetic polarity in the antenna and DC current in an opposite direction in the coil induces an opposite magnetic polarity in the rod, and a signal generator connected to the rod, the signal generator transmitting the test fundamental frequency to the rod. The rod is positioned horizontally while transmitting the test signal and detecting the reflected wave, and detecting the reflected wave comprises detecting a downward force on the rod.

In other embodiments, the method includes, from a location different from the test location, transmitting a signal from the antenna at the location, where the signal includes a fundamental frequency, the signal penetrates ground under the location, the location is selected to locate the material at a depth under the location, and the fundamental frequency matches the resonant frequency of the resonant atom of the molecule of the material. In the embodiments, the method includes detecting a reflected wave on the antenna, determining a time difference between transmission of the signal and detection of the reflected wave on the antenna, and determining the depth to the material based on the time difference and a reflected velocity corresponding to the material.

In some embodiments, the antenna is a first antenna set to a magnetic polarity, the signal from the first antenna is a first signal, the time difference is a first time difference, and the method includes, while transmitting the first signal by the first antenna, transmitting a second signal from a second antenna located a distance from the first antenna, where the second signal includes the fundamental frequency, and the second antenna is set to an opposite magnetic polarity as the magnetic polarity of the first antenna, detecting a reflected wave on the second antenna, and repeating, at varying distances from the first antenna, transmitting the second signal and detecting a reflected wave on the second signal to find an edge location where a reflected wave is not detected by the second antenna. In the embodiments, the method includes transmitting the second signal from the second antenna at a signal detection location, detecting a reflected wave on the second antenna at the signal detection location, the signal detection location located nearer the first antenna than the edge location and close to the edge location, determining a second time difference between transmission of the second signal and detection of the reflected wave on the second antenna, calculating a first/second time difference between the first time difference and the second time difference, and determining a thickness of the material based on the first/second time difference and the reflected velocity corresponding to the material.

In some embodiments, the reflected velocity corresponding to the material is an adjusted reflected velocity, where the adjusted reflected velocity is adjusted based on a measurement of magnetic field strength at the test location based on equation:

$$RV^* = \frac{(B - 512.47 \text{ mG})}{512.47 \text{ mG} * RRV * 1.517} + RV$$

wherein:
  B is the magnetic field strength measured at the test location; and
  RV is a calculated reflected velocity of the material at a reference location with a known depth of the material.

An apparatus for calculating a magnetic influence factor (MIF) between an atom and a resonant atom of a molecule of a material includes a magnetometer configured to determine a current magnetic field strength at a test location above a quantity of material buried at the test location, and a transmission circuit configured to transmit a test signal from an antenna at the test location. The test signal includes a test fundamental frequency. The apparatus includes a wave detector configured to detect, at the test location, a reflected wave comprising the test fundamental frequency on the antenna and a depth calculator configured to vary the test fundamental frequency while the transmission circuit retransmits the test signal and the wave detector detects a reflected wave until reflected waves of various test frequencies are detected, and a resonant frequency calculator is configured to identify from the detected reflected waves a resonant frequency corresponding to a maximum magnitude of the detected reflected waves. The material includes molecules with a resonant atom and at least one atom different than the resonant atom.

In some embodiments, an equation for the resonant frequency is:

$$RF=|(B+MIF)(L)|$$

where RF is the resonant frequency, B is a magnetic field strength at the test location, and L is a Larmor Precessional Frequency of the resonant atom. In other embodiments, the resonant frequency corresponds to magnetic influence factor (MIF) between the different atom and the resonant atom of the molecule of the material, and the apparatus includes an MIF module configured to calculate the MIF between the different atom and the resonant atom using the determined magnetic field strength at the test location, a Larmor Precessional Frequency of the resonant atom, the resonant frequency corresponding to the maximum magnitude of the reflected wave, and a resonant frequency equation.

In some embodiments, in response to the MIF module determining a MIF for each atom of the molecule different than the resonant atom, the transmission circuit is configured to transmit a second test signal from the antenna at the test location. The second test signal is a second test fundamental frequency corresponding to a combination of two or more atoms and/or magnetic spins of the two or more atoms of the molecule of the material different than the combination of two or more atoms and/or magnetic spins of the two or more atoms assumed for determining a first resonant frequency. In the embodiments, the wave detector is further configured to detect, at the test location, a reflected wave comprising the second test fundamental frequency on the antenna and the depth calculator is further configured to vary the second test fundamental frequency while the transmission circuit retransmits the second test signal and the wave detector is configured to detect a reflected wave until reflected waves of various second test fundamental frequencies are detected and the apparatus includes a resonant frequency calculator configured to identify from the detected reflected waves a resonant frequency corresponding to a maximum magnitude of the detected reflected waves, wherein the resonant frequency corresponds to a summed magnetic influence factor (ΣMIF) between the different atoms and the resonant atom of the molecule of the material. In the embodiments, the apparatus the MIF module is further configured to calculate the ΣMIF between the different atoms and the resonant atom using the determined magnetic field strength at the test location, a Larmor Precessional Frequency of the resonant atom, the resonant frequency corresponding to the maximum magnitude of the reflected wave, each MIF for each atom of the molecule different than the resonant atom and a resonant frequency equation:

$$RF=|(B+\Sigma MIF)(L)|$$

wherein ΣMIF is a summation of magnetic influence factors of the atoms of the molecule of the material different from the resonant atom.

In some embodiments, the antenna includes a rod, a coil wound around the rod, a DC current source configured to transmit a DC current in the coil, where DC current in the coil induces a magnetic polarity in the antenna and DC current in an opposite direction in the coil induces an opposite magnetic polarity in the rod, and a signal generator connected to the rod, the signal generator transmitting the test fundamental frequency to the rod. The rod is positioned horizontally while transmitting the test signal and detecting the reflected wave. Detecting the reflected wave includes detecting a downward force on the rod.

In other embodiments, the apparatus includes, from a location different from the test location, the transmission circuit is configured to transmit a signal from the antenna at the location. The signal includes a fundamental frequency, the signal penetrates ground under the location, the location is selected to locate the material at a depth under the location, and the fundamental frequency matches the resonant frequency of the resonant atom of the molecule of the material. In the embodiments, the wave detector is configured to detect a reflected wave on the antenna, a timer configured to determine a time difference between transmission of the signal and detection of the reflected wave on the antenna, and the depth calculator is configured to determine the depth to the material based on the time difference and a reflected velocity corresponding to the material.

In some embodiments, the transmission circuit is a first transmission circuit, the wave detector is a first wave detector, the timer is a first timer, the depth calculator is a first depth calculator, the antenna is a first antenna set to a magnetic polarity, the signal from the first antenna is a first signal, the time difference is a first time difference, the depth of the material is a depth to a top of the material, and the apparatus includes, while transmitting the first signal by the first antenna, a second transmission circuit configured to transmit a second signal from a second antenna located a distance from the first antenna, where the second signal includes the fundamental frequency and the second antenna set to an opposite magnetic polarity as the magnetic polarity of the first antenna, a second wave detector configured to detect a reflected wave on the second antenna, and the second transmission circuit is configured to repeat, at varying distances from the first antenna, transmitting the second signal and detecting a reflected wave on the second signal to find an edge location where a reflected wave is not detected by the second antenna. In the embodiments, the second transmission circuit is configured to transmit the second signal from the second antenna at a signal detection location, the second wave detector is configured to detect a reflected wave on the second antenna at the signal detection location, where the signal detection location is located nearer the first antenna than the edge location and close to the edge location, a second timer is configured to determine a second time difference between transmission of the second signal and detection of the reflected wave on the second antenna, a second depth calculator is configured to determine a first/second time difference between the first time difference and the second time difference, and a thickness calculator is configured to determine a thickness of the material based on the first/second time difference and the reflected velocity corresponding to the material.

In some embodiments, the reflected velocity corresponding to the material is an adjusted reflected velocity, and the apparatus includes a reflected velocity module configured to adjust the reflected velocity based on a measurement of magnetic field strength, by a magnetometer, at the test location based on equation:

$$RV^* = \frac{(B - 512.47 \text{ mG})}{512.47 \text{ mG} * RV * 1.517} + RV$$

where B is the magnetic field strength measured at the test location, and RV is a calculated reflected velocity of the material at a reference location with a known depth of the material.

An antenna for determining a depth of a material includes a rod, a coil wound around the rod, and a DC current source configured to transmit a DC current in the coil. DC current in the coil induces an electromagnetic field with a particular polarity in the antenna and DC current in an opposite direction in the coil induces an electromagnetic field with an opposite polarity in the rod. The antenna includes a signal generator connected to the rod. The signal generator is configured to transmit a signal comprising a fundamental frequency to the rod. The antenna includes a transmission circuit configured to cause the signal generator to transmit the signal to the rod. The rod is positioned horizontally while transmitting the signal, where the fundamental frequency is a resonant frequency of a molecule of a material buried below a location where the antenna is located. The resonant frequency is correlated to a resonant atom of the molecule and one or more magnetic influence factors (MIF). Each MIF includes an amount of magnetic influence between the resonant atom and an atom of the molecule different from the resonant atom. The antenna includes a wave detector configured to detect a reflected wave. Detection of the reflected wave includes detecting a downward force on the rod above a threshold. The antenna includes a timer configured to measure a time difference between transmission of the signal and detection of the reflected wave, and a depth calculator configured to determine a depth of the material based on the time difference and a reflected velocity corresponding to the resonant atom.

In some embodiments, the antenna includes a polarity switch configured to cause the DC current source to transmit DC current in the coil in a first direction at a first magnitude in response to being set to a north polarity position and configured to cause the DC current source to transmit DC current in the coil in a second direction opposite the first direction and at a second magnitude in response to being set to a south polarity. In other embodiments, the wave detector includes a spring device with a first end connected toward a first end of the rod. The spring device is configured to provide a spring force in an upward direction during transmission of the signal. A second end of the rod distal to the first end of the rod is maintained in a fixed position allowing movement of the first end of the rod up and down and a second end of the spring device is maintained at a location above the second end of the spring device to maintain the rod in the horizontal position. Detection of the reflected wave causes the downward force sufficient to overcome the spring force of the spring device and move the first end of the rod downward. In other embodiments, the rod includes a first end and a second end distal to the first end and the wave detector includes a strain gauge connected to the second end of the rod, where detection of the downward force includes the strain gauge detecting a downward force on the rod above a threshold.

Mineral signature detection ("MSD") uses the interrelated connection between three natural phenomena: nuclear magnetic spin, gravitational wave radiation and the effect on nuclear magnetic spin and gravitational wave radiation of the earth's magnetic field. Electromagnetic radiation ("EMR") experiences refraction when passing from one transparent substance, such as water to another. For example, light passing through water causes the light waves of various frequencies to refract at different angles causing a rainbow. Higher frequencies experience greater refraction. Elements emit a set of light frequencies unique to that element. A spectrometer is an instrument used to identify an element by observing the refraction set of emitted light frequencies. When a white light source is pointed at a refracting prism, higher frequency light is refracted more than lower frequency light so that purple and blue light refract more than green, yellow and red light and appear at the bottom of refracted light while red and yellow appear at the top of refracted light. Using a spectrometer, each type of light source emits a unique light pattern so that viewing a particular light pattern is used to identify a type of light source emitting the light. The same principle may be used for detection of other materials at frequencies outside the visible light spectrum.

Gravitational radiation waves and electromagnetic waves both travel at the speed of light and both display similar frequency dependent wave refraction properties. Both wave types exemplify polarized characteristics. While spectroscopy is a means to identify a mineral source using light radiation, gravitational radiation using MSD is a means to identify a mineral source using gravitational waves. Light radiation is limited to above surface observation. Gravitational radiation is not limited to above surface observation.

Figure 9:
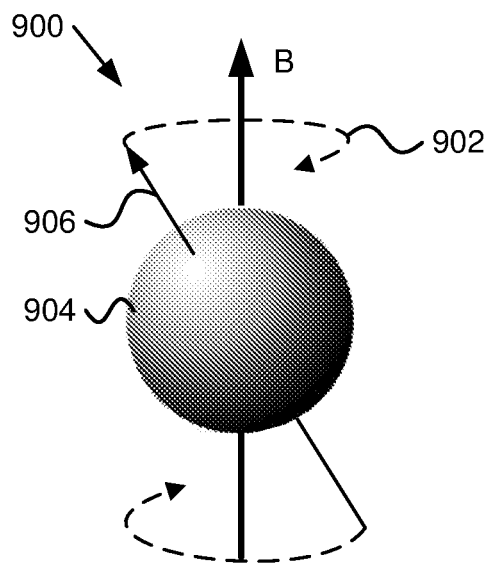
FIG. 9 is a diagram illustrating Larmor precession of an atom, according to various embodiments.

Atoms having a ground state nuclear magnetic spin create a magnetic sphere of influence. FIG. 9 is a diagram 900 illustrating Larmor precession 902 of an atom 904. Larmor precession is the precession of the magnetic moment of the atom nucleus in an external magnetic field. The atom nucleus with a magnetic moment also has angular momentum and effective internal electric current proportional to their angular momentum. When subjected to a magnetic field B, the axis 906 of an atom nucleus spins processional in a circular path like a spinning top at a particular velocity. This velocity of is the Larmor Processional Frequency and is dependent on the strength of the magnetic field B. The atom's particle-wave nature requires it to be oriented either with or opposite to the overall direction of the magnetic field B.

Since all atoms have gravity properties, the Larmor Precessional Frequency of an atom also gives rise to a companion gravitational radiation frequency of the atom. The gravitational radiation frequency likewise is dependent on a sum of the magnetic sphere of influences on the atoms in a molecule. The magnetic spin of atoms covalently bonded in a molecule intrinsically influence each other. Allowed orientations, combinations, and permutations of the atoms in a given molecule give rise to a unique set of gravity radiation frequencies for the molecule.

Around 2001, the inventor discovered that for the earth's magnetic field of 517 mG, hydrogen resonates at a Larmor Precessional Frequency of 2200 hertz ("Hz"). Another resonance for water was detected at about 5600 Hz. Assuming that there was spin coupling and an assumed influence of one hydrogen atom of a water molecule to the other hydrogen molecule of the water molecule, 2200 Hz subtracted from 5600 Hz results in 3400 Hz. Subtracting 3400 from 2200 results in −1200 where 2200 Hz is the earth's magnetic field influence on hydrogen at the measured magnetic field strength of 517 milli-gauss ("mG") at the location where the test was performed. Additional testing confirmed that a hydrogen atom in a water molecule has an intrinsic magnetic influence factor ("MIF") of 806.13 mG on the other covalently bonded hydrogen atom of the water molecule. This principle applies to any atom with spin covalently bonded with other atoms in a molecule.

FIG. 1 is a schematic block diagram illustrating one embodiment of a locator apparatus 100 for determining presence and depth of materials in the earth. The locator apparatus 100 includes a rod 102, a coil 104, a signal generator 106, a direct current ("DC") current source 108 with a polarity switch 110, a controller 112 with a transmission circuit 114, a wave detector 116, a timer 118, and a depth calculator 120, a hinge point 122 and a connector 124, which are described below.

The DC current source 108 is connected to the coil 104 and the signal generator 106 is connected to the rod 102 forming an antenna. For a particular material located under a location, the controller 112 sets the signal generator 106 to a fundamental frequency that is a resonant frequency of a particular resonant atom. The transmission circuit 114 controls the DC current source 108 to transmit a particular DC current in the coil 104, and the transmission circuit 114 of the controller 112 turns on the signal generator 106 to transmit a signal with a fundamental frequency matching the resonant atom. After a time, the wave detector 116 detects a reflected wave at the antenna. The timer 118 determines a time difference between when the transmission circuit 114 causes the signal generator 106 to transmit the signal and a time when the reflected wave is detected. The depth calculator 120 determines a depth of the material buried below the antenna based on the time difference determined by the timer 118 and a reflected velocity value for the resonant atom in feet per second.

The locator apparatus 100 includes an antenna formed by a rod 102 with a coil 104 wound around the rod 102. In some embodiments, the rod 102 has a length in a first direction that is greater than a width or depth where the width and depth are perpendicular to the first direction. The coil 104, in some embodiments, is wound around the rod 102 along the length of the rod 102 in the first direction. In some embodiments, the rod 102 is cylindrical. In other embodiments, the rod 102 is cuboid with some rectangular or square sides. In other embodiments, the rod 102 is a triangular prism. In other embodiments, the rod 102 is of another shape. The rod 102 of the antenna is shaped so that when the coil 104 is wrapped around the rod 102 a reflected wave causes a reaction with the antenna. In some embodiments, an end of the rod 102 becomes a hinge point 122 or fulcrum so that a reflected wave, acts on the rod 102 and causes a force that moves an end of the rod 102 distal to the hinge point 122 moves. In other embodiments, the antenna when in use is positioned horizonal to the ground and the coil 104 is wound around the rod 102 in a direction parallel to the ground so a force from the reflected wave coming from the ground exerts a force on the rod 102.

In some embodiments, the rod 102 is of a material that is non-ferrous and/or non-magnetic. In some examples, the rod 102 is made of a non-ferrous metal, such as brass, aluminum, silver, copper, chrome-nickel, and the like. In other embodiments, the rod 102 is made of another material, such as plastic, wood, glass, polymers, etc. In other embodiments, the rod 102 is weakly paramagnetic. The rod 102 is non-magnetic or at least weakly paramagnetic to reduce magnetic field effects on the rod 102. In some embodiments, the rod 102 is conductive. For example, where the rod 102 is brass, the rod 102 may better act as an antenna or a portion of an antenna for transmitting a signal.

The coil 104 is wrapped around the rod 102 and is designed to generate an electromagnetic field of a particular magnetic strength while connected to the DC current source 108 with a DC current transmitted through the coil 104. Wire of the coil 104 is designed to handle a particular current. In some embodiments, a number of turns of wire in the coil 104 combined with a DC current level produce a magnetic field strength about equal to a magnetic field strength at a location where the locator apparatus 100 is used. For example, the magnetic field strength may be around 524 milli-gauss ("mG") and the turns of the coil 104 and DC current may be set to produce a magnetic field strength of around 500 mG. In many locations in the northern hemisphere the magnetic field is in the range of about 450 mG to about 550 mG and the rod 102 and coil 104 having a magnetic field strength of around 500 mG is typically sufficient. Other locations, such as around the equator or in the southern hemisphere where the magnetic field strength is different may require a different number of turns of the coil 104 and/or a different DC current.

In a particular example, the coil 104 is wrapped with wire at 100 turns per inch and is 4¾ inches on a 5¼ inch brass rod 102, which results in about 475 turns. The DC current source 108 transmits a DC current in the range of about 45-65 milli-amperes ("mA") through the coil 104 while the polarity switch 110 is set to a "north" position so the DC current travels through the coil 104 in a first direction. Where the polarity switch 110 is set to a "south" position so DC current is flowing in an opposite direction to the first direction, the DC current source transmits current in a range of about 75-95 mA. In some embodiments, the DC current source is set to 55 mA in when the polarity switch 110 is set to north and 85 mA while the polarity switch is set to south.

The magnetic field strength of the antenna of the example above is sufficient for many locations in north America. In other locations where the measured magnetic field strength differs significantly from around 525 mG, the DC current in the coil 104 and/or the number of turns per inch of wire on the coil 104 may need to change to minimize effects of the earth's magnetic field at the location where the locator apparatus 100 is used. The magnetic field strength may be determined from various websites and agencies, such as the Magnetic Field Calculators webpage of the National Oceanic and Atmospheric Administration at https://www.ngdc.noaa.gov. A more accurate method of determining magnetic field strength a location is to directly measure the magnetic field strength at the location at the time of testing. Note that the magnetic field strength varies by altitude. For example, at a particular location, the magnetic field strength may be 511.87 mG at ground level, which is 4800 feet ("ft") above sea level. At a depth of 5000 feet below ground, which is 200 feet below sea level, the magnetic field strength would be 512.25 mG. At a depth of 10,000 feet below ground, which is 5200 feet below sea level, the magnetic field strength would be 512.64 mG.

Figure 15:
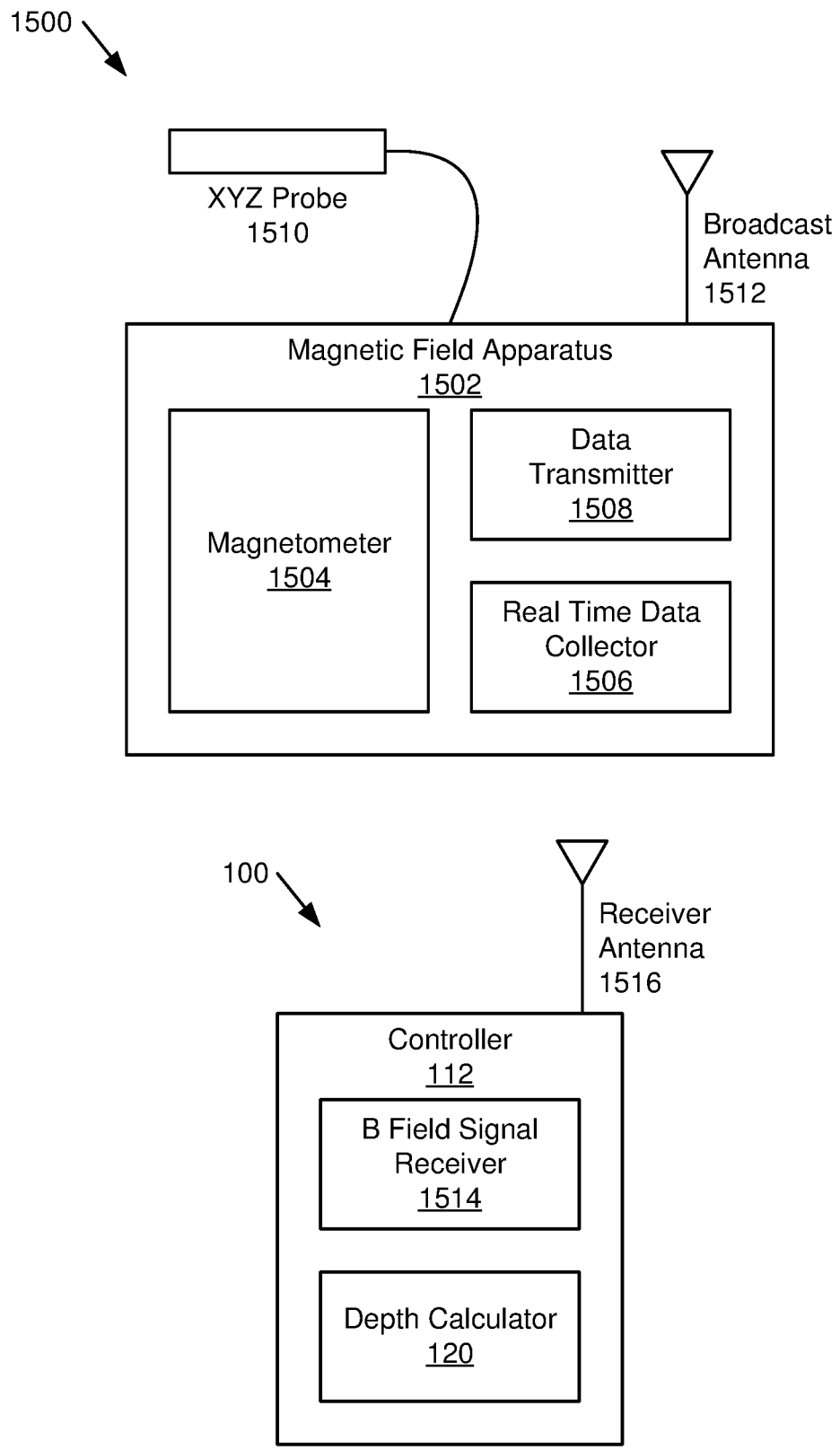
FIG. 15 is a schematic block diagram illustrating a local magnetic field measuring station, according to various embodiments.

FIG. 15 is a schematic block diagram illustrating a local magnetic field measuring station 1500, according to various embodiments. The local magnetic field measuring station 1500 includes a magnetic field apparatus 1502 with a magnetometer 1504, a real time data collector 1506, a data transmitter 1508, an XYZ probe 1510, and a broadcast antenna 1512, and a controller 112 of the locator apparatus 100 that includes a B-field signal receiver 1514, and a receiver antenna 1516, which are described below.

The local magnetic field measuring station 1500 is intended to be placed in proximity to where the locator apparatus 100 is being used. The local magnetic field measuring station 1500 is placed far enough away from the locator apparatus 100, vehicles, metallic objects, etc. to get a clean reading of the magnetic field of the location where the locator apparatus 100 is being used. Typically, the magnetic field does not change much within a short distance, such as 100 yards, a 1000 yards, or thereabouts. While the earth's magnetic field is measured and published for various locations, the magnetic field strength has a tendency to change, even over the course of a day. Having the local magnetic field measuring station 1500 provide real-time adjustment of magnetic field strength for the locator apparatus 100.

The local magnetic field measuring station 1500 includes a magnetometer 1504 that senses the earth's magnetic field at the location of the local magnetic field measuring station 1500. The magnetometer 1504 transmits data to a real time data connector 1506, which then uses a data transmitter 1508 to transmit magnetic field readings over a broadcast antenna 1512. The controller 112 includes a B-field signal receiver 1514 and associated receiver antenna 1516 that receive the magnetic field data transmitted from the local magnetic field measuring station 1500 and use the magnetic field data to input in the depth calculator 120, which uses magnetic field strength.

In some embodiments, the depth calculator 120 include a rate limiter and/or magnetic field thresholds. The magnetic field thresholds, in some embodiments, are a particular amount above and/or below a published magnetic field strength for the location. Where a rate of the magnetic field strength varies more than a rate limit or varies above or below a magnetic field threshold, the locator apparatus 100 sends an alert or takes corrective action. In some embodiments, the corrective action may be to reset the magnetic field strength to a known good value, to a published value, or the like. The rate limiter and magnetic field thresholds provide a solution when something affects measurements of magnetic field strength by the local magnetic field measuring station 1500.

In some embodiments, the local magnetic field measuring station 1500 includes an XYZ probe 1510 connected to the magnetometer 1504 where the XYZ probe 1510 receives magnetic field strength data. The XYZ probe 1510 may be placed in a particular orientation and may receive magnetic field data along x and y coordinates that correspond to north-south and east-west as well as a z coordinate that corresponds to a vertical coordinate. The XYZ probe 1510 transmits the x, y, and z vector information to the magnetometer 1504, which then provides a magnitude as well as polar coordinates or other information known to those of skill in the art. In other embodiments, the local magnetic field measuring station 1500 does not include the XYZ probe 1510 and the local magnetic field measuring station 1500 include an internal probe that measures magnitude of the earth's magnetic field strength at the location of the local magnetic field measuring station 1500. Other embodiments, include other ways to measure the earth's magnetic field strength at or near where the locator apparatus 100 is being used.

The signal generator 106 is connected to the rod 102 and is configured to transmit a signal that includes a fundamental frequency to the rod 102. In some embodiments, the signal generator 106 is a variable frequency signal generator capable of transmitting a signal at various frequencies within a range between a lowest resonant frequency and a highest resonant frequency. For example, the signal generator 106 may have a range of 20 Hz to around 500 kilohertz ("kHz"). In other embodiments, the signal generator 106 is capable of generating a signal with a fundamental frequency in the mega-hertz or giga-hertz range. In some embodiments, the signal generator 106 transmits a sine wave. In other embodiments, the signal generator 106 transmits a quasi-sine wave with a fundamental frequency as selected. In other embodiments, the signal generator 106 transmits a square wave with a fundamental frequency as selected. A sine wave is generally preferred so that harmonics of the fundamental frequency are not present or are minimized.

The signal generator 106 and/or controller 112 includes a user interface to allow a user to set the fundamental frequency of the signal. The user interface may include a dial with an indicator of a selected frequency, may include a dial with a digital display of the selected frequency, may include up/down buttons with a digital display of the selected frequency, and the like. In some embodiments, the controller 112 include a user interface, such as a digital display, and an input device, such as a mouse, a keyboard, a touchscreen, etc. to allow a user to input a desired resonant atom and/or molecule of the material being sought and the controller 112 sets the fundamental frequency of the signal generator 106. One of skill in the art will recognize other ways for the locator apparatus 100 to include a user interface to allow a user to set a desired fundamental frequency of the signal.

The DC current source 108 is configured to transmit a DC current in the coil 104 where DC current in the coil 104 induces an electromagnetic field of a particular polarity in the antenna and DC current in an opposite direction in the coil induces an electromagnetic field of an opposite polarity in the rod 102. The DC current source 108, in some embodiments, generates DC current in the milli-ampere range. In other embodiments, the DC current source 108 is capable of generating a higher DC current, such as in a 0-10 ampere range. The DC current source 108, in some embodiments, is selected to generate an appropriate DC current for the number of turns in the coil 104 for a desired electromagnetic field strength. The DC current source 108, in some embodiments, is variable over a desired DC current range. In other embodiments, the DC current source 108 is configured to transmit discrete DC current amplitudes.

In some embodiments, the DC current source includes a polarity switch 110 that reverses DC current direction (e.g., positive to negative). In some embodiments, the polarity switch 110 is a double-pole, double-throw switch that reverses polarity of output terminals with respect to a particular polarity of input terminals. In other embodiments, the polarity switch 110 is an electronically controlled switch or relay controlled by the transmission circuit 114 or other switch available to a user and remote from the polarity switch 110. One of skill in the art will recognize other polarity switches 110 that allow a user or program code to switch polarity of DC current through the coil 104.

The controller 112 is depicted with the transmission circuit 114, the timer 118, the depth calculator 120, and the wave detector 116. Other embodiments of the controller 112 include one or more of the signal generators 106 and the DC current source 108. Other embodiments of the controller include less components than are depicted in FIG. 1. For example, the timer 118, in some embodiments, is a separate timing circuit that may be manually started and stopped. In other embodiments, the wave detector 116 includes a visual indication of movement of the antenna. In other embodiments, the depth calculator 120 includes a separate device that uses a net penetration value of the resonant atom multiplied by a time difference determined by the timer 118.

In some embodiments, the controller 112 includes hardware circuits, switches, buttons, etc. The controller 112, in some embodiments, is implemented with a VLSI circuit. In other embodiments, the controller 112 is implemented with a programmable hardware device, such as a FPGA, programmable logic array, etc. In other embodiments, the controller 112 includes a processor and memory and one or more components 114, 116, 118, 120 of the controller 112 are partially or completely implemented with program code stored in non-volatile computer readable storage media. For example, a portion of the controller 112 may include program code that includes a timer algorithm, a depth calculator, controls for transmitting the signal, etc. and may also include resonant frequencies for atoms, Larmor Precessional Frequencies, MIFs, etc. along with code to translate various numbers for different measured magnetic field strengths at various locations where the locator apparatus 100 is used. One of skill in the art will recognize other ways to implement the controller and which functions to include in the controller 112.

The transmission circuit 114 is configured to cause the signal generator 106 to transmit the signal to the rod 102. In some embodiments, the rod 102 is positioned horizontally while transmitting the signal and the fundamental frequency of the signal is a resonant frequency of a molecule of a material buried below a location where the antenna is located. The resonant frequency correlates to a resonant atom of the molecule and one or more magnetic influence factors ("MIFs"). Each MIF includes an amount of magnetic influence between the resonant atom and an atom of the molecule different from the resonant atom. In other embodiments, the transmission circuit 114 causes the signal generator 106 to transmit the signal to the rod 102 in response to user input. For example, the locator apparatus 100 may include a start button or similar mechanism and once the user presses the start button, flips a switch, etc., the transmission circuit 114 causes the signal generator 106 to transmit the signal.

In some embodiments, the transmission circuit 114 also controls the DC current source 108 and turns on the DC current source 108 prior to transmission of the signal. In other embodiments, the transmission circuit 114 controls the magnitude of the DC current transmitted by the DC current source 108. In other embodiments, the transmission circuit 114 controls the polarity switch 110.

The timer 118 is configured to measure a time difference between transmission of the signal and detection of the reflected wave. The timer 118, in some embodiments, tracks a signal from the transmission circuit 114 to start the timer 118 and a signal from the wave detector 116 to measure when the antenna detects the reflected wave. In other embodiments, the timer 118 is a manual timer, such as a stopwatch where a user starts the timer 118 simultaneously with transmission of the signal and stops the timer 118 with a visual indication of the reflected wave moving the rod 102. In other embodiments, the wave detector 116 electronically detects the reflected wave and signals the timer 118 upon detection of the reflected wave.

The wave detector 116 is configured to detect a reflected wave. In some embodiments, the wave detector 116 is configured to detect the reflected wave by detecting a downward force on the rod 102. Downward as used herein includes a direction toward the earth where the material being detected is presumed to be. In some embodiments, detecting movement of the rod 102 in a downward direction includes detecting downward movement of the rod sufficient to overcome a spring force in an upward direction exerted by a spring mechanism supporting the rod 102. The spring mechanism, in some embodiments, is all or part of the connector 124, 124a, 124b. As used herein, detecting downward movement of the rod sufficient to overcome a spring force in an upward direction exerted by a spring mechanism supporting the rod 102 includes a force that will enable the rod 102 to move in a downward direction. In some embodiments, detecting downward movement of the rod sufficient to overcome a spring force includes the spring force having a breakover point where a downward force due to the reflected wave is a force above a threshold that will cause the rod 102 to move downward past the breakover point.

Figure 3:
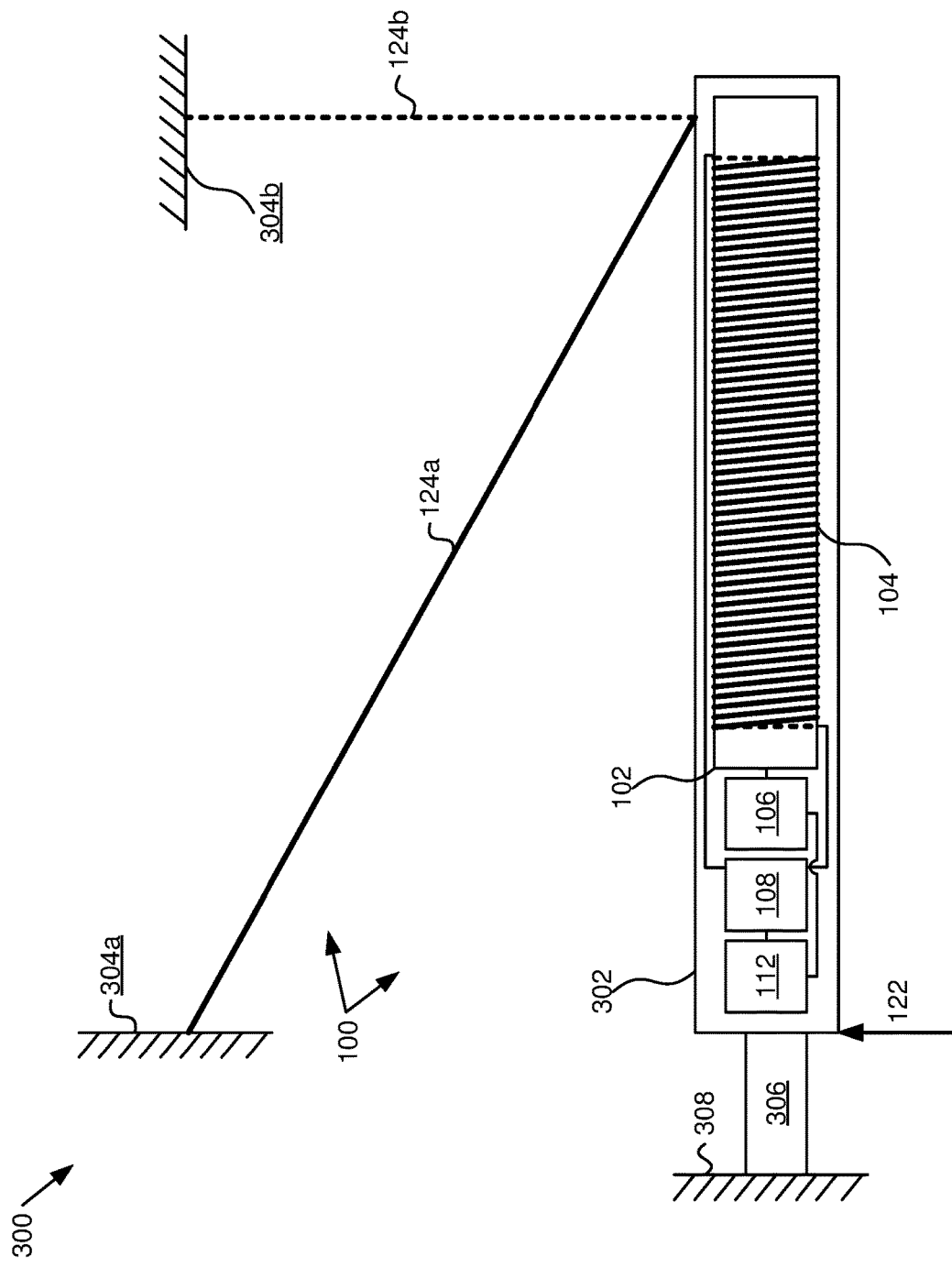
FIG. 3 is a schematic block diagram illustrating another locator apparatus of FIG. 1 with various ways to determine presence of a reflected wave after a signal has been sent.

In some embodiments, detecting the downward force includes detecting the downward force on a strain gauge connected to the rod 102 above a threshold. In some embodiments, The wave detector 116 is coupled to the rod 102 via a connector 124. Various embodiments of the wave detector 116 are depicted in FIG. 3 and are discussed below.

The depth calculator 120 is configured to determine the depth of the material based on the time difference and a reflected velocity corresponding to the resonant atom. Where the timer 118 determines a particular time difference between transmission of the signal and detection of the reflected wave on the antenna, the depth calculator 120 uses this time difference and multiplies the time difference by a reflected velocity of the resonant atom to determine the depth of the material. As an example, if the time difference is 30 seconds and the resonant atom is hydrogen at a reflected velocity of 15 feet per second, the depth is 30 seconds times 15 feet/second=450 feet.

Reflected velocity, as used herein, is a term given to a rate calculated for a particular material where the rate for a particular material is determined by measuring the time between transmitting the signal and detection of a reflected wave on the antenna where the material being sought is a known depth below where the signal is transmitted. Reflected velocities for materials have been derived based on measurements above known deposits of various materials. For example, where silicon dioxide (sand) is known to be a certain depth below a particular location, the locator apparatus 100 was used to measure an amount of time between transmission of a signal and detection of a reflected waveform. The reflected velocity for silicon dioxide was then calculated based on the measurements. This process has been repeated for other materials.

Note that reflected velocity varies based on the earth's magnetic field strength at the location of the measurement. As the magnetic field strength varies, the reflected velocity also varies. Table 1 includes reflected velocities ("RV") for several materials. The magnetic field strength was measured at 525.6 mG for a first location, which is at the Grays Lake Well CPC 17-1 in Bonneville County, Idaho which has carbon dioxide at a known depth of 8640 feet. The reflected velocity for several materials is in the RV* column at this first site for the measured magnetic field strength of 525. mG.

The right RV* column includes adjusted reflected velocities for the same materials. The RV* column is for a second location with a magnetic field strength of 502 mG. The second location is Covenant Field Well 17-1 in Sigurd, Utah where silicon dioxide is at a known depth of 5840 feet. From the reflected velocities measured at each location, Equation (1) was developed for adjustment of the magnetic field strength based on a current magnetic field strength reading. Equation 1 is:

$$RV^* = \frac{(B - 512.47 \text{ mG})}{512.47 \text{ mG} * RV * 1.517} + RV \quad (1)$$

where the magnetic field strength factor 512.47 mG and an adjustment constant of 1.517 percent for every one percent change in magnetic field strength. B in equation (1) is a current measurement of magnetic field strength.

TABLE 1

Initial and corrected reflected velocities

| Material | RV B = 512.47 mG | RV* B = 525.6 mG | RV* B = 502 mG |
| --- | --- | --- | --- |
| Hydrogen | 15 | 15.58 | 14.54 |
| Oxygen | 21.62 | 22.46 | 20.95 |
| Silicon | 27.91 | 28.99 | 27.04 |
| Deuterium | 29.18 | 30.31 | 28.28 |
| Iron | 100 | 103.89 | 96.90 |
| Carbon | 694 | 720.97 | 672.49 |

In other embodiments, the depth calculator 120 determines a thickness of the material by determining a depth of the bottom of the layer of material and subtracting the depth at the top of the layer of material from the depth at the bottom of the layer of material. For example, where the depth of the top of the layer of material is 450 feet and a second signal is transmitted at a second location as explained below with respect to FIG. 2 and it takes 31 seconds to detect a second reflected wave then the depth to the bottom of the layer of material is 465 feet so the depth calculator 120 determines that the thickness of 15 feet.

Figure 2:
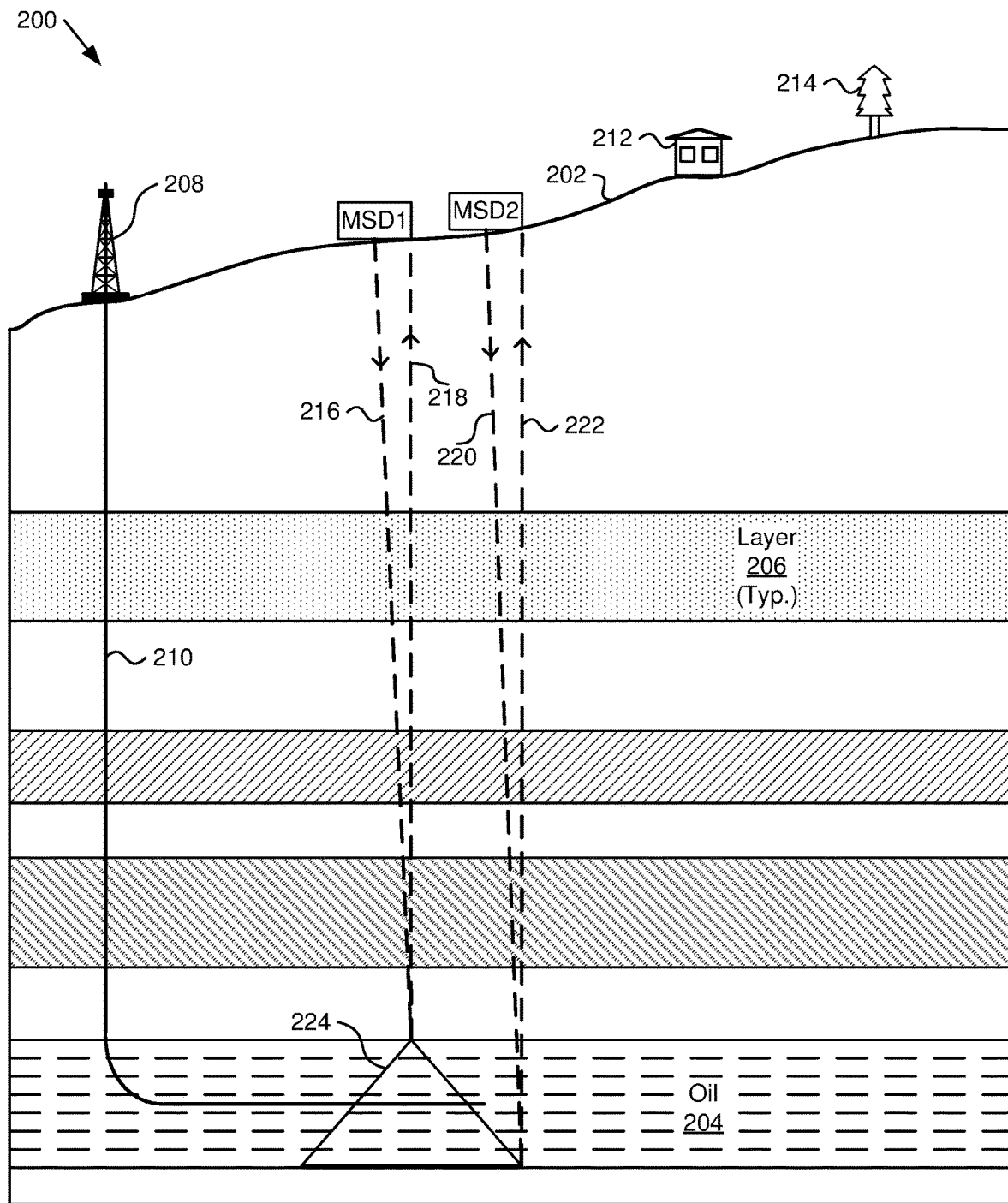
FIG. 2 is a schematic block diagram illustrating using the locator apparatus of FIG. 1 to determine presence and depth of materials in the earth, according to various embodiments.

FIG. 2 is a schematic block diagram 200 illustrating using the locator apparatus 100 of FIG. 1 to determine presence and depth of materials in the earth. The diagram 200 includes a ground level 202, a layer of oil 204 ("oil 204"), other layers 206, an oil derrick 208, an oil shaft 210, a house 212, a tree 214, a first MSD apparatus ("MSD1"), a second MSD apparatus ("MSD2"), a first signal 216, a first reflected wave 218, a second signal 220, a second reflected wave 222, and a wave cone 224, which are described below. Note that the oil layer 204 may be any hydrocarbon, such as crude oil, methane, propane, etc.

MSD1, in some embodiments, is a first device that includes the locator apparatus 100 and MSD2 is a second device that includes the locator apparatus 100. The diagram 200 includes a ground level 202, which slopes up from left to right above an oil layer 204 and other layers 206 below the oil layer 204. The diagram 200 includes an oil derrick 208 with an oil shaft 210 drilled from the oil derrick 208 to the oil layer 204. A house 212 and a tree 214 are depicted above the ground level 202 to depict any type of landscape that may include oil 204 below. MSD1 is placed in a first location to detect the presence of oil 204 below the first location. The oil 204 is a hydrocarbon with at least hydrogen atoms and carbon atoms. Other atoms, molecules and impurities may be mixed in with the oil 204. MSD1 is useful to detect the presence and depth to the top of the oil 204 and MSD2 is useful in detecting a thickness of the oil layer 204.

Initially, MSD1 transmits a signal with a fundamental frequency that matches a resonant frequency of hydrogen or carbon in a particular sought for molecular structure. For example, the resonant atom may be carbon 13 ("$C^{13}$") or hydrogen. In one example, the sought for molecular structure is methane which includes a single $C^{13}$ atom with four hydrogen atoms covalently bonded to the $C^{13}$ atom. For methane, the resonant atom may be chosen to be hydrogen, which includes one $C^{13}$ atom bonded to the hydrogen atom and three hydrogen atoms bonded to the $C^{13}$ atom, all of which affect the resonant hydrogen atom. Where the hydrogen atom is selected as the resonant atom for methane, a resonant frequency is selected in the 17 kHz range. MSD1 sets the resonant frequency transmitted by the signal generator 106 and the transmission circuit 114 causes the signal generator 106 to begin transmitting the first signal 216 with the resonant frequency for the hydrogen atom of methane and after a time the wave detector 116 detects the first reflected wave 218, which confirms the presence of methane.

The timer 118 determines a time difference between transmission of the first signal 216 and detection of the first reflected wave 218 for use in determining a depth of the methane. The depth is to a top of the methane. Molecules often have different resonant frequencies depending on which atom is chosen as the resonant atom and the direction of the magnetic spin on various atoms. For example, methane includes one carbon $C^{13}$ atom and four hydrogen atoms. One resonant frequency occurs when a hydrogen atom is selected as the resonant atom while the carbon $C^{13}$ atom and other three hydrogen atoms have a magnetic spin aligned with the earth's magnetic field. A different resonant frequency is present where the magnetic spin for a hydrogen atom is opposite the earth's magnetic field. Some molecules may have a same resonant frequency as other molecules, depending on magnetic spin of atoms of the molecules. Where further confirmation of detection of a particular molecule, such as methane, is desired, MSD1 may transmit a different resonant frequency of the sought for molecule and detection of a reflected wave for each transmitted resonant frequency may then be used to further confirm the presence of the molecule.

Detection of the first reflected wave 218 establishes presence of an oil layer 204 and the depth calculator 120 uses a time difference between transmission of the first signal 216 and detection of the first reflected wave 218 to determine a depth of a top of the oil layer 204. Transmission of the first signal 216 diffracts in the oil layer 204 when the first signal 216 reaches the oil layer 204 to form a wave cone 224. The shape of the wave cone 224 is dependent on the fundamental frequency of the first signal 216. The wave cone 224 terminates at a bottom of the oil layer 204. MSD2 transmits a second signal 220 at a second location away from the first location where MSD1 is simultaneously transmitting the first signal 216. The second signal 220 is an opposite polarity than the first signal 216. For example, where the first signal 216 is a north polarity, the second signal 220 is set to a south polarity. Where MSD2 detects a second reflected wave 222, the timer 118 determines a difference between transmission of the second signal 220 and detection of the second reflected wave 222 and the depth calculator 120 determines the depth of the oil 204 at the second location.

Where MSD2 detects the second reflected wave 222, MSD2 is moved further away from the first location and transmits the second signal 220 again. The second location is adjusted until MSD2 is no longer able to detect the second reflected wave 222. At this point, MSD2 is moved short distances toward the first location until the second reflected wave 222 is again detected, which is at or close to where the wave cone 224 terminates at the bottom of the oil layer 204. The depth calculator 120 then determines a depth of the bottom of the oil layer 204. The depth calculator 120 then determines a thickness of the oil layer 204 from the calculated depth of the top of the oil layer 204 and the calculated depth of the bottom of the oil layer 204. Note that experimentation has shown that while MSD1 is transmitting the first signal 216, placement of MSD2 beyond the wave cone 224 will result in no detection of a second reflected wave 222. While the wave cone 224 is ideally a perfect cone, edges of the oil layer 204 and depth variations of the top and bottom of the oil layer 204 affect the shape of an actual wave cone 224.

FIG. 3 is a schematic block diagram illustrating another embodiment 300 of the locator apparatus 100 of FIG. 1 with various ways to determine presence of a reflected wave after a signal has been sent. In the embodiment, the rod 102 and coil 104, the controller 112, signal generator 106 and DC current source 108 are depicted in an enclosure 302. In one embodiment, the hinge point 122 is as depicted and the connector 124a is a spring device with a spring-like function and is connected to a fixed element 304a. In the embodiment, the hinge point 122 may be a hinge or something similar that is anchored the fixed element 304a that extends down to at least the hinge point 122. In some embodiments, the fixed element 304a is a vertical support, such as a post, a frame, or other device that is connected to the connector 124a as a spring device and serves as an anchor for a hinge or similar device at the hinge point 122.

Note that while the hinge point 122 is depicted at the bottom left corner of the enclosure 302, the hinge point 122 may be along the left edge of the enclosure 302, at the top left corner of the enclosure, along the bottom edge of the enclosure 302 toward the left side, along the top edge of the enclosure 302 toward the left edge, etc. The hinge point 122 may be placed anywhere on the enclosure 302 that will serve to allow a reflected wave to be a downward force on the enclosure 302 in a way that will allow measurement of the force or movement of the enclosure 302 or portions of the enclosure 302 to the right of the hinge point 122.

In embodiments where the connector 124 is a spring device, the connector 124 may be a spring, an elastic cord, or similar material that provides a spring force against movement of a right side of the enclosure 302 in a downward direction while the hinge point 122 is fixed. In the embodiment, the spring device (e.g., connector 124) has a spring force that balances weight of the locator apparatus 100 and is responsive to the reflective wave such that the enclosure 302 moves downward about the hinge point 122. In some embodiments, the fixed element 304a supporting a top end of the connector 124 is positioned to allow a breakover point where movement of the right side of the enclosure 302 in the downward direction past the breakover point allows a reduced spring force on the connector 124 so the right side of the enclosure 302 drops down until being pulled up to a horizontal position. In some embodiments, the fixed element 304a and hinge point 122 are held by a user. In other embodiments, the fixed element 304a and hinge point 122 are mounted to a device held by a user.

In other embodiments, the connector 124a is a cable, rope, string, etc. and does not have an intentional spring force and the wave detector 116 is a device that measures force, such as a strain gauge and is connected at some point in line with the connector 124a and measures force on the enclosure 302 caused by the reflected wave interacting with the antenna in the enclosure 302. The strain gauge may be in or at the enclosure 302 and connected to an end of the connector 124a, may be connected to or located within the fixed element 304a, or may be in line with the connector 124a.

In other embodiments, the connector 124 is a connector 124b positioned vertically to fixed element 304b located above right side of the enclosure 302. Again, the connector 124b may include a spring device or may be a cable, cord, etc. and the wave detector 116 may include a strain gauge. Again, the strain gauge may be in or at the enclosure 302 and connected to an end of the connector 124b, may be connected to or located within the fixed element 304b, or may be in line with the connector 124b.

In another embodiment, the enclosure 302 may be connected to a support 306 that includes a device to measure force on the enclosure 302, such as a strain gauge. In the embodiment, the support may be connected to a fixed element 308, such as a post, a frame, etc. One of skill in the art will recognize other ways for the wave detector 116 to detect a reflected wave.

Figure 4:
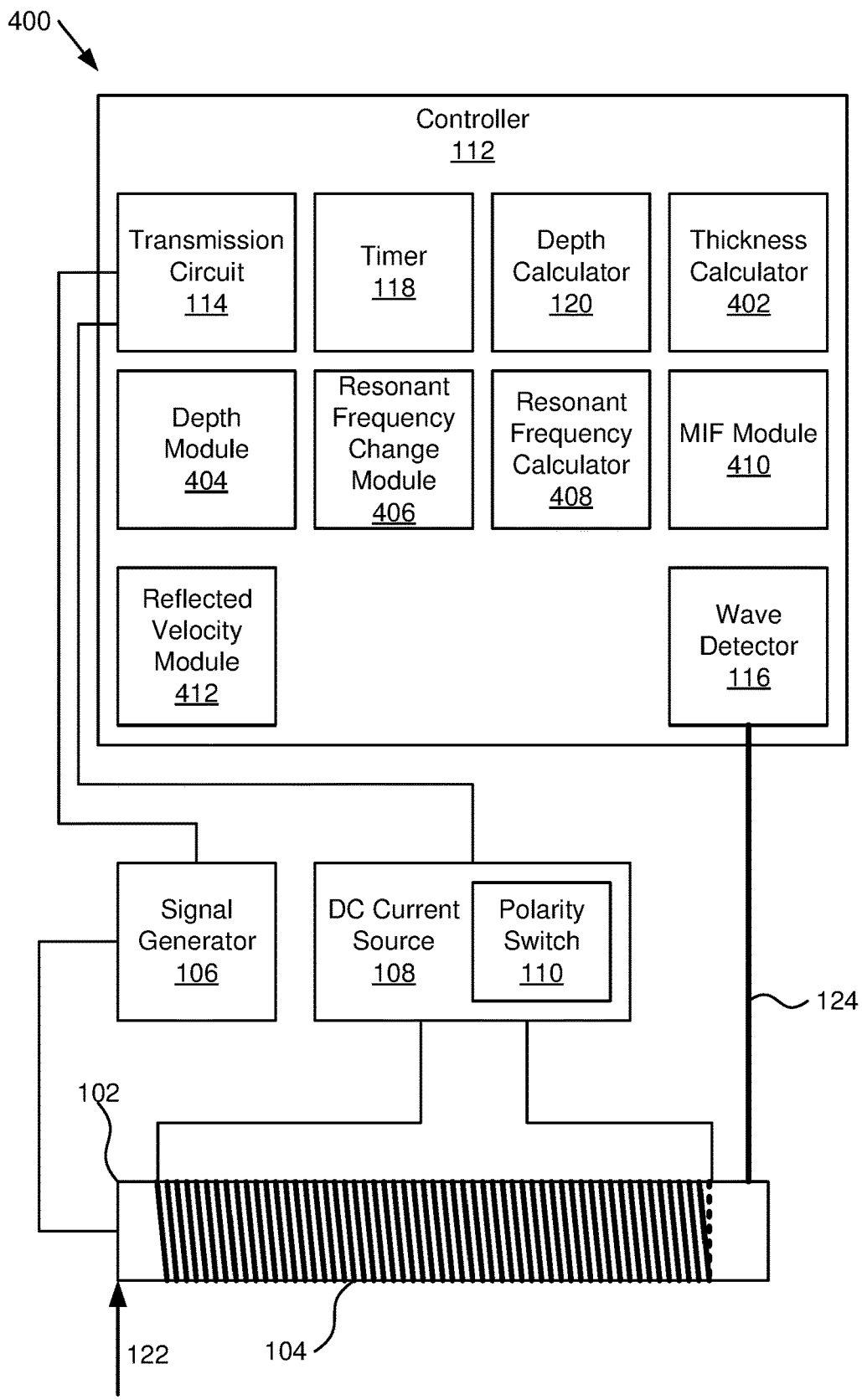
FIG. 4 is a schematic block diagram illustrating another locator apparatus for determining presence and depth of materials in the earth, according to various embodiments.

FIG. 4 is a schematic block diagram illustrating another locator apparatus 400 for determining presence and depth of materials in the earth, according to various embodiments. The locator apparatus 400 includes a rod 102, a coil 104, a signal generator 106, a direct current ("DC") current source 108 with a polarity switch 110, a controller 112 with a transmission circuit 114, a wave detector 116, a timer 118, and a depth calculator 120, a hinge point 122 and a connector 124, which are substantially similar to those described above in relation to the locator apparatus 100 of FIGS. 1-3. In various embodiments, the locator apparatus 400 includes a thickness calculator 402, a depth module 404, a resonant frequency change module 406, a resonant frequency calculator 408, an MIF module 410, and/or a reflected velocity module, which are described below.

In some embodiments, the locator apparatus 400 includes a thickness calculator 402 configured to determine a thickness of the material by subtracting the depth of the top of the material and the depth of the bottom of the material. The thickness calculator 402 is configured to be used with a second locator apparatus 400 (e.g., second MSD apparatus MSD2) as depicted in FIG. 2 where a second depth calculator 120 determines a depth to the bottom of the material. In some embodiments, the thickness calculator 402 uses a depth to the top of the material found by a first depth calculator 120 of a first locator apparatus 400 (e.g., a first MSD apparatus MSD1) and a depth to the bottom of the material found by a second depth calculator 120 in the second locator apparatus 100/400 (e.g., MSD2). In other embodiments, the thickness calculator 402 subtracts a first time difference found by the first locator apparatus 100/400 from a second time difference found by the second locator apparatus 400 to find a first/second time difference and then multiplies the first/second time difference by a reflected of the material to find the thickness of the material.

In some embodiments, the locator apparatus 400 includes depth module 404 configured to adjust the magnetic field strength B at the location to correspond to a depth below the location. In some instances, the wave detector 116 may fail to detect a reflected wave due to a change in magnetic field strength differences between the magnetic field strength at the surface at the location and the magnetic field strength at the depth of the material, as described in more detail with regard to the method 500 of FIGS. 5A and 5B. Where the wave detector 116 fails to detect a reflected wave, the depth module 404 adjusts the magnetic field strength B to another depth below the surface at the location.

In some embodiments, the locator apparatus 400 includes a resonant frequency change module 406 configured to change the resonant frequency to an adjusted resonant frequency based on the resonant frequency equation (2) and the adjusted magnetic field strength B, supplied by the depth module 404, for the depth below the location. The transmission circuit 114 then transmits an adjusted signal from the antenna at the location. The adjusted signal includes an adjusted fundamental frequency where the adjusted fundamental frequency is based on the adjusted resonant frequency from the resonant frequency change module 406. The wave detector 116 attempts to detect a reflected wave on the antenna. Where the wave detector 116 does not detect a reflected wave, the depth module 404 tries another depth and determines the magnetic field strength B at the location and the resonant frequency change module 406 then changes the resonant frequency for the transmission circuit 114 to again transmit another adjusted signal. The process repeats until either the wave detector 116 detects a reflected waveform or until exhausting attempts to detect a reflected waveform.

In some embodiments, the locator apparatus 400 includes a resonant frequency calculator 408 configured to calculate the known resonant frequency based on the resonant frequency equation (2). The resonant frequency calculator 408 includes, in some embodiments, equation (2). The resonant frequency calculator 408, in some embodiments, includes an input function to input magnetic field strength B, such as from a magnetometer (e.g., magnetometer 1504 of FIG. 15), from user input, from a table, from a database, from a magnetic field calculator, or the like. In some embodiments, the resonant frequency calculator 408 includes Larmor Precessional Frequencies of various atoms and/or an ability to receive a Larmor Precessional Frequency of an atom. In some embodiments, the resonant frequency calculator 408 includes an MIF of various atoms of molecules for various spins and is able to sum MIFs of various atoms, depending on a particular resonant atom of a molecule. One of skill in the art will recognize other inputs, equations, databases, etc. for the resonant frequency calculator 408 to calculate a resonant frequency of a resonant atom being sought by the locator apparatus 400.

In some embodiments, the locator apparatus 400 includes an MIF module 410 configured to calculate the MIF between the different atom and the resonant atom of a molecule of a material at a location with the material at a known depth using a determined magnetic field strength at the test location, a Larmor Precessional Frequency of the resonant atom, the resonant frequency corresponding to the maximum magnitude of the reflected wave, and the resonant frequency equation. The MIF module 410 is used when trying to determine the MIF of a molecule, as described below with regard to the methods 700, 800 of FIGS. 7 and 8.

In some embodiments, the reflected velocity corresponding to the material is an adjusted reflected velocity, and the locator apparatus 400 includes a reflected velocity module 412 configured to adjust the reflected velocity based on a measurement of magnetic field strength, by a magnetometer 1504, at the test location based on equation (1). Adjusting reflected velocity is described in more detail above with respect to the depth calculator 120.

Figure 5:
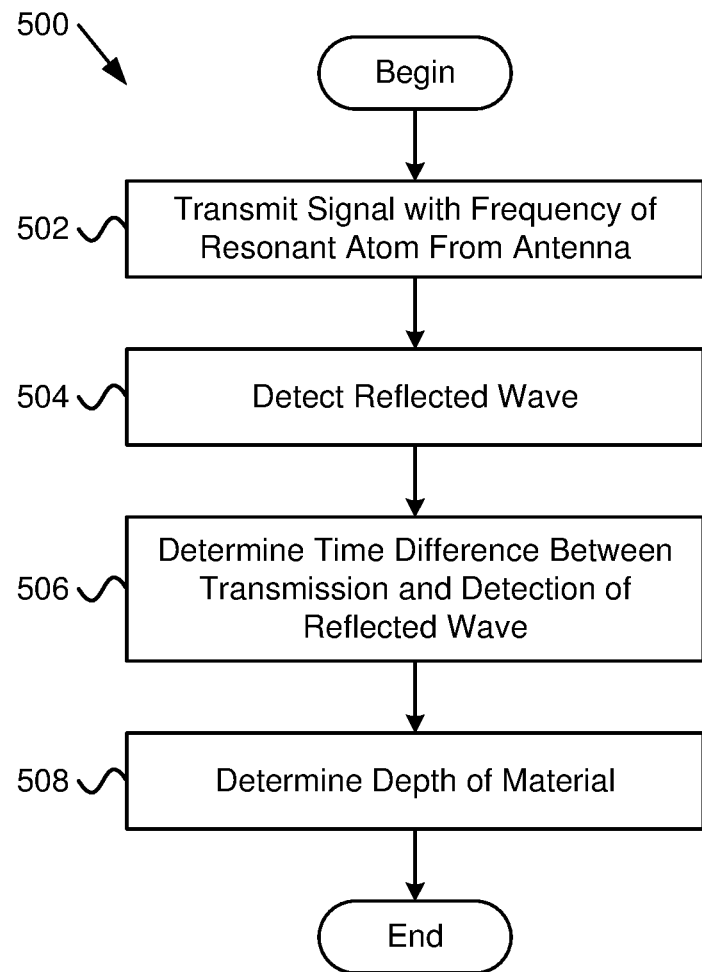
FIG. 5 is a schematic flowchart diagram illustrating a method for determining presence and depth of materials in the earth, according to various embodiments.

FIG. 5 is a schematic flowchart diagram illustrating one embodiment of a method 500 for determining presence and depth of materials in the earth. The method 500 begins and transmits 502 a signal from an antenna at a location. The signal includes a fundamental frequency and the signal penetrates ground under the location. The location is selected to locate a material at a depth under the location and the fundamental frequency matches a known resonant frequency of a resonant atom of a molecule of the material. The method 500 detects 504 a reflected wave on the antenna and determines 506 a time difference between transmission of the signal and detection of the reflected wave on the antenna. The method 500 determines 508 the depth of the material based on the time difference and a reflected velocity corresponding to the resonant atom, and the method 500 ends. In various embodiments, the method 500 is implemented using one or more of the rod 102, the coil 104, the signal generator 106, the DC current source 108, the transmission circuit 114, the wave detector 116, the timer 118 and the depth calculator 120.

Figure 6A:
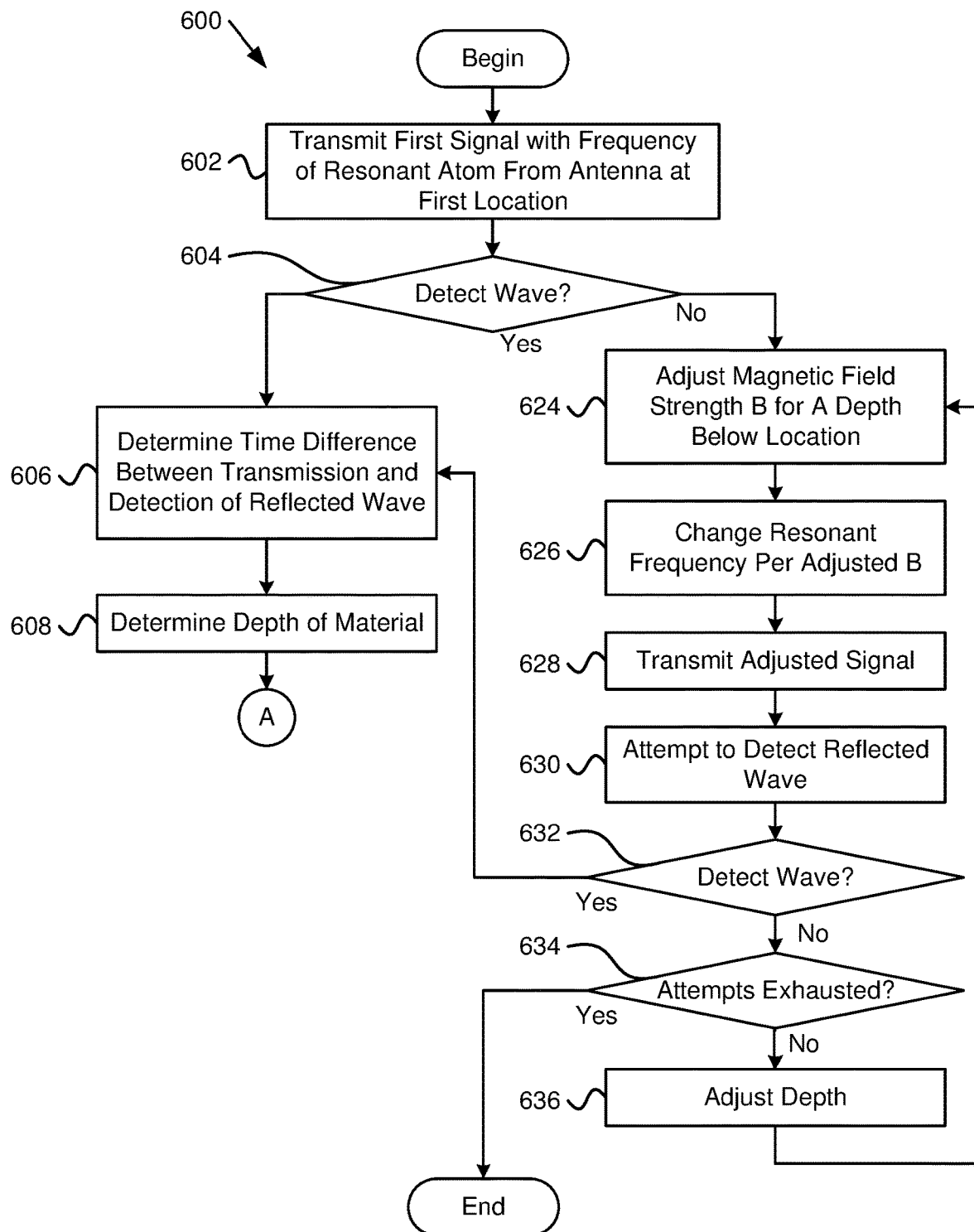
FIG. 6A is a first part of a schematic flowchart diagram illustrating another method for determining presence and depth of materials in the earth, according to various embodiments.
Figure 6B:
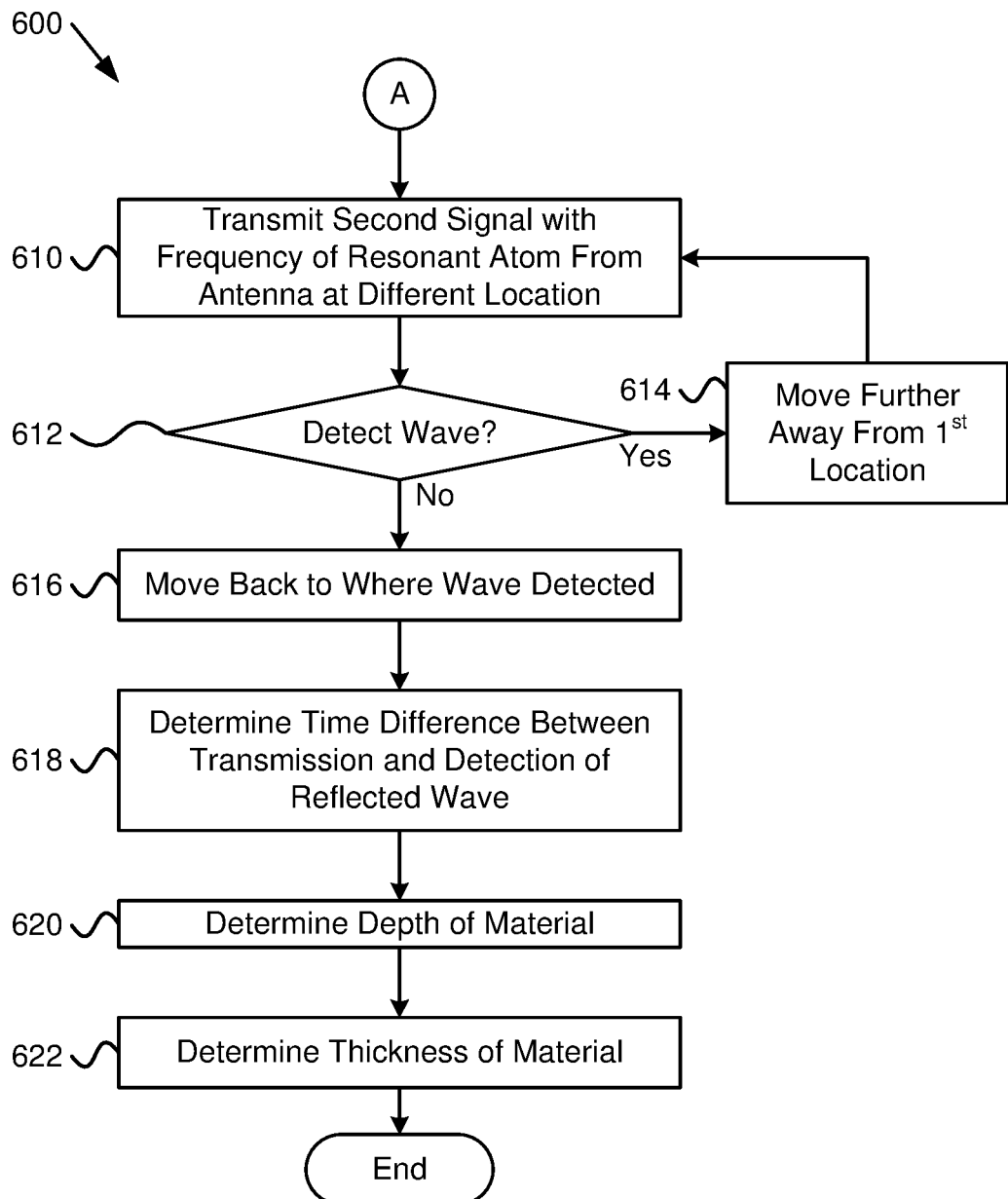
FIG. 6B is a second part of the method of FIG. 6A.

FIG. 6A is a first part and FIG. 6B is a second part of a schematic flowchart diagram illustrating another embodiment of a method 600 for determining presence and depth of materials in the earth. The method 600 is similar to what is depicted in FIG. 2. The method 600 begins and transmits 602 a first signal 216 from a first antenna (e.g., MSD1) at a first location. The first signal 216 includes a fundamental frequency and the first signal 216 penetrates ground under the first location. The first location is selected to locate a material (e.g., 204) at a depth under the first location and the fundamental frequency matches a known resonant frequency of a resonant atom of a molecule of the material. The method 600 determines 604 if a first reflected wave 218 is detected on the first antenna. If the method 600 determines 604 that a first reflected wave is detected, the method 600 determines 606 a first time difference between transmission of the first signal 216 and detection of the first reflected wave 218 on the first antenna. The method 600 determines 608 the depth of the material (e.g., 204) based on the first time difference and a reflected velocity corresponding to the resonant atom.

The method 600 transmits 610 (follow "A" on FIG. 6A to "A" on FIG. 6B) a second signal 220 from a second antenna (e.g., MSD2) located a distance from the first antenna. The second signal 220 includes the fundamental frequency and the second antenna is set to an opposite magnetic polarity as the magnetic polarity of the first antenna. The method 600 determines 612 if a second reflected wave 222 is detected. If the method 600 determines 612 that a second reflected wave 222 is detected, the method 600 moves 614 the second antenna further from the first location and again transmits 610 the second signal 220. If the method 600 determines 612 that a second reflected wave 222 is not detected, the method 600 moves 616 back to where the second reflected wave 222 is not detected. In various embodiments, the user may move 614, 616 the second antenna back and forth to more accurately detect an edge of the wave cone 224 and then moves 616 toward the first location just enough to detect the second reflected wave 222.

The method 600 determines 618 a second time difference between transmission of the second signal 220 and detection of the second reflected wave 222 on the second antenna and determines 620 a depth of a bottom of the material based on the second time difference and the reflected velocity corresponding to the resonant atom. The method 600 determines 622 a thickness of the material by subtracting the depth of the top of the material and the depth of the bottom of the material, and the method 600 ends.

If the method 600 determines 604 that the first reflected wave is not detected, the method 600 adjusts 624 a magnetic field strength B at the location to correspond to a depth below the location. Magnetic field strength B varies based on depth below a surface of a location. The National Oceanic and Atmospheric Administration ("NOAA") publishes a webpage that includes a magnetic field calculator at: (https://www.ngdc.noaa.gov/geomag/calculators/magsca; e.shtml?useFullSite=true#igrfwm) (last visited Jun. 16, 2022) that provides magnetic field strengths at various locations at various locations above or below sea level. In some embodiments, magnetic field strength is used to determine a resonant frequency of the resonant atom as described below with regards to equation (2). Changes in the magnetic field strength B affect the resonant frequency of the resonant atom.

For example, Table 2 includes magnetic field strengths from the NOAA magnetic field calculator webpage for Stevensville, Montana at the zip code 59870. Table 2 includes magnetic field strength B in milli Gauss ("mG"), elevation, depth below the listed elevation, change in the magnetic field strength (B Change), change factor per 5000 feet of depth (Δ+mG/5K ft Depth), and the date the NOAA magnetic field calculator was accessed. Table 3 includes magnetic field strengths from the NOAA magnetic field calculator webpage for the CPC Well 17-1 at Grays Lake, Idaho and type of information in the columns of Table 3 are the same as for Table 2.

TABLE 2

Magnetic Field Strength at Stevenson, Montana

| B mG | Elevation | Depth | B Change | Δ + mG/5K ft Depth | Date |
|---|---|---|---|---|---|
| 537.33 | 3300 | 0 | | | Jun. 16, 2022 |
| 537.74 | −1700 | 5000 | 0.41 | 0.00076303 | Jun. 16, 2022 |
| 538.15 | −6700 | 10000 | 0.82 | 0.00076303 | Jun. 16, 2022 |
| 538.56 | −11700 | 15000 | 1.23 | 0.00076303 | Jun. 16, 2022 |
| 538.97 | −16700 | 20000 | 1.64 | 0.00076303 | Jun. 16, 2022 |
| 539.38 | −21700 | 25000 | 2.05 | 0.00076303 | Jun. 16, 2022 |
| 539.79 | −26700 | 30000 | 2.46 | 0.00076303 | Jun. 16, 2022 |

TABLE 3

Magnetic Field Strength at CPC Well 17-1 at Grays Lake, Idaho

| B mG | Elevation | Depth | B Change | Δ + mG/5K ft Depth | Date |
|---|---|---|---|---|---|
| 524.53 | 6417 | 0 | | | Jun. 16, 2022 |
| 524.93 | 1417 | 5000 | 0.40 | 0.00076259 | Jun. 16, 2022 |
| 525.33 | −3583 | 10000 | 0.80 | 0.00076259 | Jun. 16, 2022 |
| 525.73 | −8583 | 15000 | 1.20 | 0.00076259 | Jun. 16, 2022 |
| 526.13 | −13583 | 20000 | 1.60 | 0.00076259 | Jun. 16, 2022 |
| 526.53 | −18583 | 25000 | 2.00 | 0.00076259 | Jun. 16, 2022 |
| 526.93 | −23583 | 30000 | 2.40 | 0.00076259 | Jun. 16, 2022 |

As can be seen from Tables 2 and 3, the magnetic field strength varies by depth. In addition, the amount of change for each 5000 feet increment is slightly different for each location. In one embodiment, the method 600 uses the NOAA magnetic field calculator to determine magnetic field strength B for each depth below ground level at the location where the signal is transmitted 602. Note that the NOAA field calculator values are updated on a periodic basis but are often different than measured magnetic field strength at a particular location. In other embodiments, the magnetic field strength B is measured at the location and a magnetic field difference is calculated between values from the NOAA magnetic field calculator and the actual measurement. Magnetic field strength is then determined using the NOAA magnetic field calculator webpage for various depths and the magnetic field difference is applied to the magnetic field strengths at the various depths to determine more accurate magnetic field strengths at the location at the various depths.

In other embodiments, a database other embodiments, a database different than the NOAA field strength calculator is used. In some embodiments, a database is constructed using measured magnetic field strengths and is used to determine magnetic field strengths at a chosen location at different depths. In other embodiments, equations are used to adjust magnetic field strength at various depths based on a known or calculated depth factor. Note that the change factor per 5000 feet (Δ+mG/5K ft Depth) in Tables 2 and 3 have different values for the different locations of Tables 2 and 3. Other locations have different changes factors as well.

In some embodiments, a change factor is determined for a location from the NOAA magnetic field calculator and then applied to a measured magnetic field at the location to determine different magnetic field strengths at the location. In other embodiments, a change factor is determined using another magnetic field calculator or by measurements and then applied to the measured magnetic field at the location to determine different magnetic field strengths at the location. One of skill in the art will recognize other ways to determine magnetic field strengths at various depths at a location.

The method 600 changes 626 the resonant frequency to an adjusted resonant frequency based on the resonant frequency equation (2) and the adjusted magnetic field strength B for the depth below the location and transmits 628 an adjusted signal from the first antenna at the location. The adjusted signal is an adjusted fundamental frequency where the adjusted fundamental frequency is based on the adjusted resonant frequency from equation (2). In some embodiments, the method 600 accesses a magnetic field calculator via network connection, accesses a local magnetic field strength database, accesses equations, etc. to adjust 624 the magnetic field strength B at the location to correspond to a depth below the location in real time and then changes 626 the resonant to the adjusted resonant frequency in real time just prior to transmitting 628 the adjusted signal. In the embodiments, the locator apparatus 100 includes code, circuitry, etc. to receive a measured magnetic field strength at or near the location, to adjust the magnetic field strength B, to change 626 the resonant frequency, and/or to transmit 628 the adjusted signal.

The method 600 attempts 630 to detect a reflected wave on the first antenna. The method 600 determines 632 if a reflected wave is detected. If the method 600 determines 632 that a reflected wave is detected at the first antenna, the method 600 returns and determines 606 a first time difference between transmission of the first signal 216 and detection of the first reflected wave 218 on the first antenna. If the method 600 determines 632 that a reflected wave is not detected, the method 600 determines 634 if a number of attempts has been exhausted. In some embodiments, the number of attempts may be based on a certain number of changes in depth within a range. In other embodiments, a user may determine when the number of attempts is exhausted after trying various depths. One of skill in the art will recognize how to determine if the number of attempts is exhausted.

If the method 600 determines 634 that the number of attempts has not been exhausted, the method 600 adjusts 636 a depth (e.g., 5000 feet below ground to 10,000 feet below ground) and returns and adjusts 624 the magnetic field strength B at the location to correspond to a depth below the location. If the method 600 determines 634 that the number of attempts has been exhausted, the method 600 ends. In various embodiments, the method 600 is implemented using the rod 102, the coil 104, the signal generator 106, the DC current source 108, the polarity switch 110, the transmission circuit 114, the wave detector 116, the timer 118 the depth calculator 120, the thickness calculator 402, the depth module 404, the resonant frequency change module 406, the resonant frequency calculator 408, and/or the MIF module 410.

Figure 7:
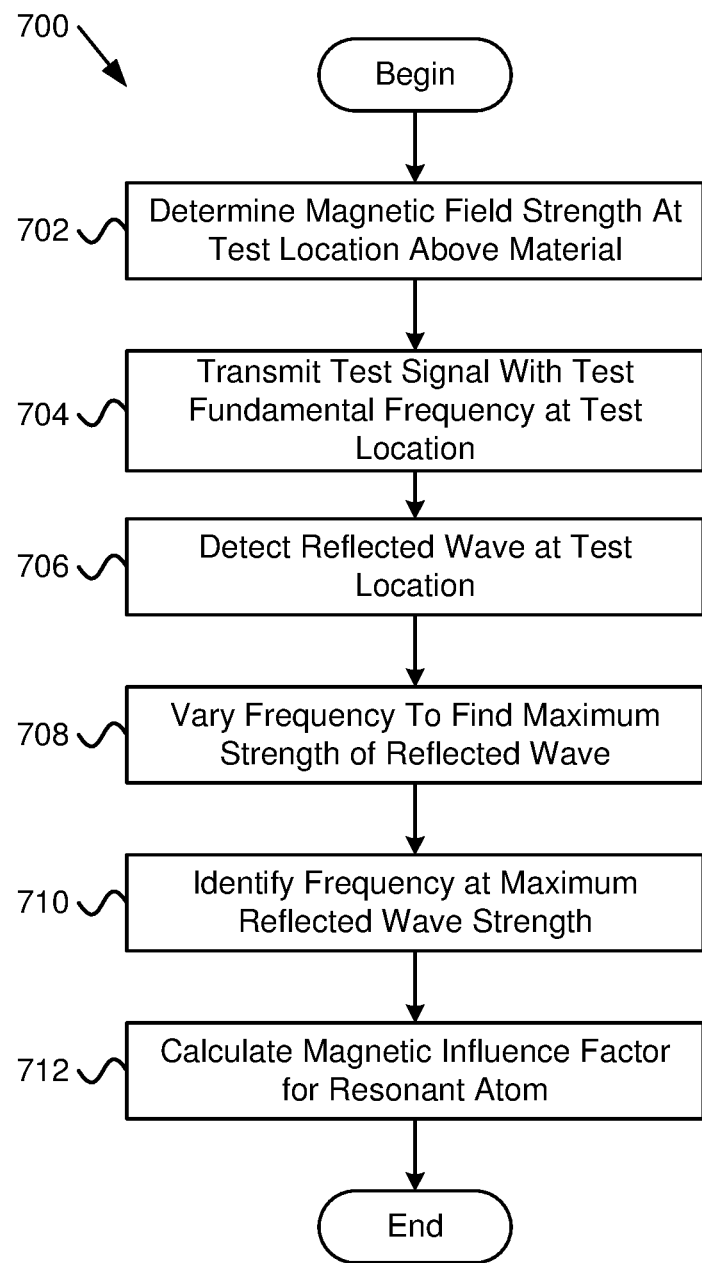
FIG. 7 is a schematic flowchart diagram illustrating a method for determining a magnetic influence factor, according to various embodiments.

FIG. 7 is a schematic flowchart diagram illustrating one embodiment of a method 700 for determining a magnetic influence factor. The method 700 begins and determines 702 a current magnetic field strength at a test location above a quantity of material buried at the test location. For example, the method 700 may determine 702 the magnetic field strength through measurement or access to a website that lists the magnetic field strength at the test location. The method 700 transmits 704 a test signal from an antenna at the test location. The test signal is a test fundamental frequency while trying to identify a fundamental frequency of a resonant atom of a molecule of the material.

The method 700 detects 706, at the test location, a reflected wave that includes the test fundamental frequency on the antenna. The method 700 varies 708 the test fundamental frequency while retransmitting the test signal and detecting a reflected wave until reflected waves of various test frequencies are detected and identifies 710 from the detected reflected waves a resonant frequency corresponding to a maximum magnitude of the detected reflected waves. The material includes molecules with the resonant atom and at least one atom different than the resonant atom. The resonant frequency corresponds to magnetic influence factor ("MIF") between the different atom and the resonant atom of the molecule of the material.

The method 700 calculates 712 the MIF between the different atom and the resonant atom using the determined magnetic field strength at the test location, a Larmor Precessional Frequency of the resonant atom, the resonant frequency corresponding to the maximum magnitude of the reflected wave, and a resonant frequency equation. The MIF on the resonant atom can be calculated from the following resonant frequency equation:

$$RF = |(B+MIF)L| \qquad (2)$$

where:
RF is the resonant frequency that corresponds to the maximum magnitude of the reflected wave;
B is the earth's magnetic field strength at the test location; and
L is a Larmor Precessional Frequency for the resonant atom.

Figure 10:
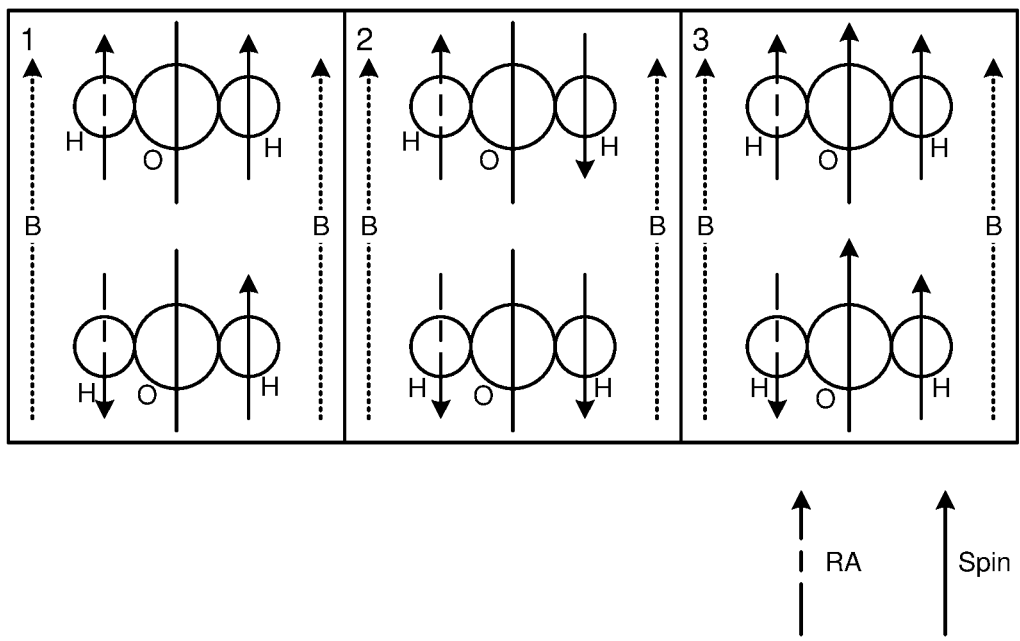
FIG. 10 is a diagram illustrating three spin orientations for a water molecule, according to various embodiments.

In equation (2), whether or not the MIF is positive or negative depends on whether or not the spin of the atom different from the resonant atom is aligned with the magnetic field of the earth. Each atom may have a spin that may be aligned in the same direction or opposite as the magnetic field of the earth. FIG. 10 is a diagram illustrating three spin orientations for a water molecule. The first diagram on the left is for a resonant atom of hydrogen on the left with no spin for the oxygen atom in the center and a positive spin for the hydrogen atom on the left. Where an atom has no spin, there is no magnetic influence on other atoms of a molecule. Where a signal with a proper resonant frequency reaches the molecule, the spin of the hydrogen atom on the left switches, which is indicated by the arrow on the left hydrogen atom on the top portion of the first diagram switching so the arrow is pointed down on the resonant hydrogen atom.

While there is no spin for the oxygen atom, the hydrogen atom has a positive spin, meaning that the magnetic moment caused by the spin aligns with the earth's magnetic field. In water, it can be expected that there are some water molecules that are configured as in the first diagram in FIG. 10. It can also be expected that at least some water molecules will be configured as in the second diagram in FIG. 10 and that at least some water molecules have an oxygen atom with spin along with spin of the hydrogen atom as depicted on the third diagram on the right of FIG. 10. Not all possible spin combinations are depicted in FIG. 10. Each configuration results in a different resonant frequency.

In one experiment, the magnetic field strength of 512.0 mG was measured above a known source of water. For the first diagram in FIG. 10 with no spin on the oxygen atom and a positive spin orientation of the hydrogen atom on the left, which is when the spin matches the earth's magnetic field orientation (arrow labeled "B"), a resonant frequency of 5,612.27 Hz was identified using the method 600 to find the resonant frequency. The Larmor Precessional Frequency for hydrogen is 4.25775 Hz/mG. Rearranging equation (2):

$$\frac{RF}{L} = |B + MIF| \quad (3)$$

Then for hydrogen for the spin orientations of the first diagram of FIG. 10, the MIF is determined as (5,612.27 Hz)/(4.25775 Hz/mG)=|512.0 mG+806.13|=1318.13 mG. Where the spin of the hydrogen atom on the right is opposite, as depicted in the second diagram of FIG. 10, then the MIF is −806.13, which is derived from—(1252.33 Hz)/(4.25775 Hz/mG)=|512.0 mG−806.13|=294.13 mG. This is due to the magnetic influence of the hydrogen atom being opposite the earth's magnetic field and identifies a second resonant frequency, 1252.33 Hz. For each frequency associated with the atom MIF aligned with B, there will always be a second frequency associated with that MIF oriented opposite to the earth magnetic field. For a water molecule, oxygen may have a magnetic spin oriented with B and a discovered resonant frequency of 9737.43 implies an MIF of 968.86 mG for oxygen: (9737.43 Hz)/(4.25775 Hz/mG=|520+806.13+968.86|=2286.99 mG.

Taking the absolute value of the terms on the right side of equation (2) is appropriate to always have a positive frequency. Note that in the above examples the first step began by finding the 5612.27 Hz resonant frequency and confirming the 806.13 mG where the hydrogen atom is the resonant atom. Next, the MIF was verified as correct by finding the 1252.13 Hz resonant frequency for the opposite orientation of the hydrogen MIF. This known information makes it possible to find a third resonant frequency at 9737.43 Hz and confirms the oxygen MIF on the resonant atom hydrogen to be 968.86 mG.

Figure 8:
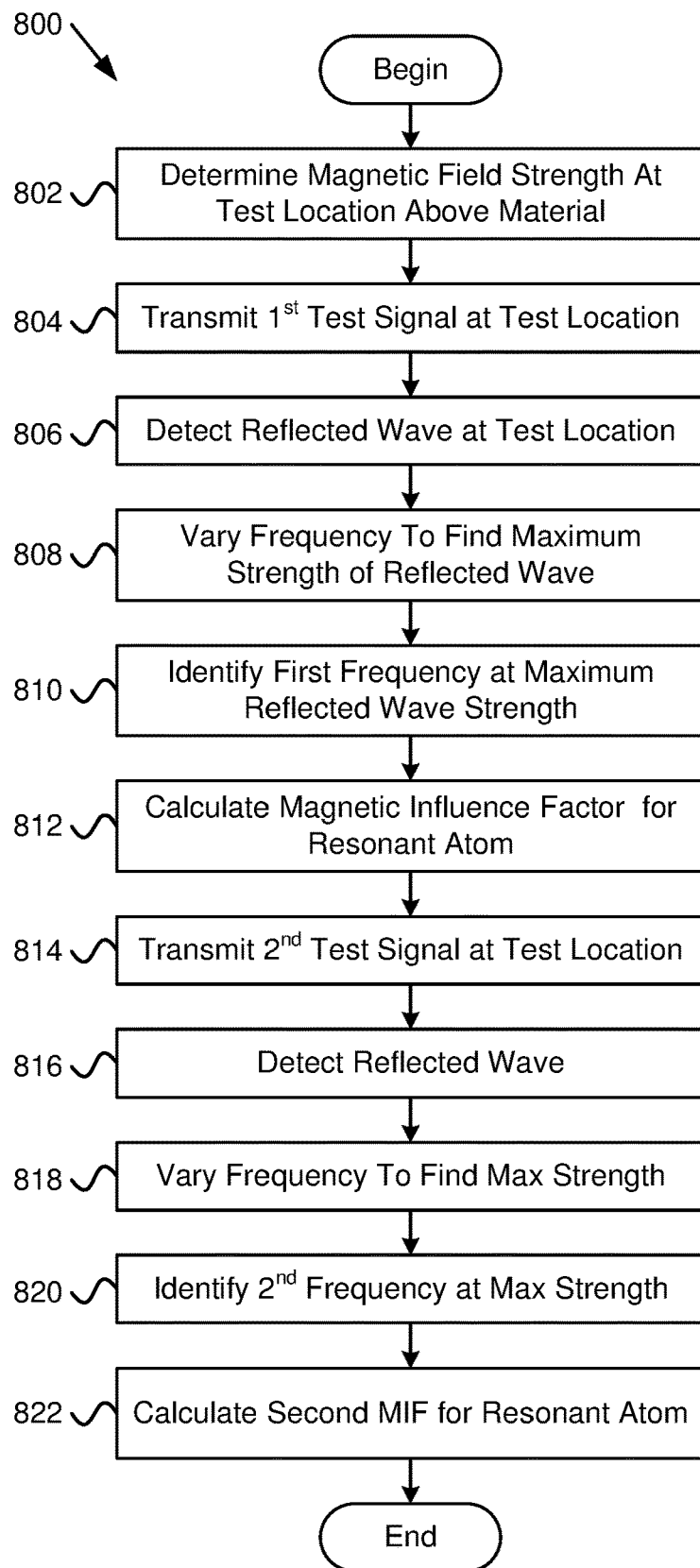
FIG. 8 is a schematic flowchart diagram illustrating another method for determining a magnetic influence factor, according to various embodiments.

FIG. 8 is a schematic flowchart diagram illustrating another embodiment of a method 800 for determining a magnetic influence factor. The method 800 is similar to the method 700 of FIG. 7 but includes a way to use a previously calculated MIF to determine another MIF. Equation (2) is applicable to molecules with multiple atoms of various spins. The MIF of each atom with respect to the resonant atom must be determined and summed, as discussed below with regard to equation (4). In various embodiments, all or a portion of the method 700 is implemented using the rod 102, the coil 104, the signal generator 106, the DC current source 108, the polarity switch 110, the transmission circuit 114, the wave detector 116, the timer 118 the depth calculator 120, the thickness calculator 402, the depth module 404, the resonant frequency change module 406, the resonant frequency calculator 408, and/or the MIF module 410.

The method 800 begins and determines 802 a current earth magnetic field strength at a test location above a quantity of material buried at the test location. The method 800 transmits 804 a first test signal from an antenna at the test location. The first test signal is a test fundamental frequency while trying to identify a first fundamental frequency of a resonant atom of a molecule of the material.

The method 800 detects 806, at the test location, a first reflected wave that includes the first test fundamental frequency on the antenna. The method 800 varies 808 the first test fundamental frequency while retransmitting the first test signal and detecting a first reflected wave until first reflected waves of various first test frequencies are detected and identifies 810 from the detected first reflected waves a first resonant frequency corresponding to a maximum magnitude of the detected first reflected waves. The material includes molecules with the resonant atom and at least one atom different than the resonant atom. The resonant frequency corresponds to a first MIF between the different atom and the resonant atom of the molecule of the material.

The method 800 calculates 812 the first MIF between the different atom and the resonant atom using the determined magnetic field strength at the test location, a Larmor Precessional Frequency of the resonant atom, the first resonant frequency corresponding to the maximum magnitude of the first reflected wave, and a resonant frequency equation, which may be equation (2).

The method 800 transmits 814 a second test signal from the antenna at the test location. The second test signal has a second test fundamental frequency corresponding to a combination of two or more atoms and/or magnetic spins of the two or more atoms of the molecule of the material different than the combination of two or more atoms and/or magnetic spins of the two or more atoms assumed for determining a first resonant frequency. For example, the third diagram of FIG. 10 assumes a positive spin orientation of the oxygen so a different resonant frequency will result from equation (2).

The method 800 detects 816, at the test location, a second reflected wave with the second test fundamental frequency on the antenna. The method 800 varies 818 the second test fundamental frequency while retransmitting the second test signal and detecting a second reflected wave until second reflected waves of various second test fundamental frequencies are detected and the method 800 identifies 820 from the detected reflected waves a second resonant frequency corresponding to a maximum magnitude of the detected second reflected waves. The second resonant frequency corresponds to a summed magnetic influence factor ("ΣMIF") between the different atoms and the resonant atom of the molecule of the material.

The method 800 calculates 822 the ΣMIF between the different atoms and the resonant atom using the determined magnetic field strength at the test location, a Larmor Precessional Frequency of the resonant atom, the second resonant frequency corresponding to the maximum magnitude of the second reflected wave, each MIF for each atom of the molecule different than the resonant atom and the resonant frequency equation:

$$RF = |(B + \Sigma MIF)L| \quad (4)$$

For the third diagram of FIG. 10, a resonant frequency of 9737.43 Hz was found and the ΣMIF would be the summation of the MIF for hydrogen of 806.13 plus the sought for MIF of the oxygen atom. The MIF for the oxygen atom is calculated from the equation:

$$\frac{RF}{L} = |B + MIF_H + MIF_O| \quad (5)$$

Substituting numbers into equation (5) results in (9,737.43 Hz)/(4.25775 Hz/mG)=|512.0 mG+806.13+MIF$_O$|=2286.99 mG and we find the MIF$_O$ for oxygen to be 986.86 mG. Thus, the method 800 of FIG. 8 may be used to derive various unique MIFs for specific atoms in various molecular configurations of various materials. However, the magnetic influence of atoms on a resonant atom depend on how far the atoms are away from the resonant atom. Experimentation has shown that atoms closer to the resonant atom have a stronger magnetic influence than atoms further away. Experimentation has also shown that atoms more than two steps away from the resonant atom do not have any appreciable effect on the total MIF or on the resonant frequency for that configuration. In addition, experimentation has shown that for hydrogen, the magnetic influence factor is the same for an atom one step away from the resonant atom or two steps away from the resonant atom. In various embodiments, all or a portion of the method 800 is implemented using the rod 102, the coil 104, the signal generator 106, the DC current source 108, the polarity switch 110, the transmission circuit 114, the wave detector 116, the timer 118 the depth calculator 120, the thickness calculator 402, the depth module 404, the resonant frequency change module 406, the resonant frequency calculator 408, and/or the MIF module 410.

Figures 11, 12:
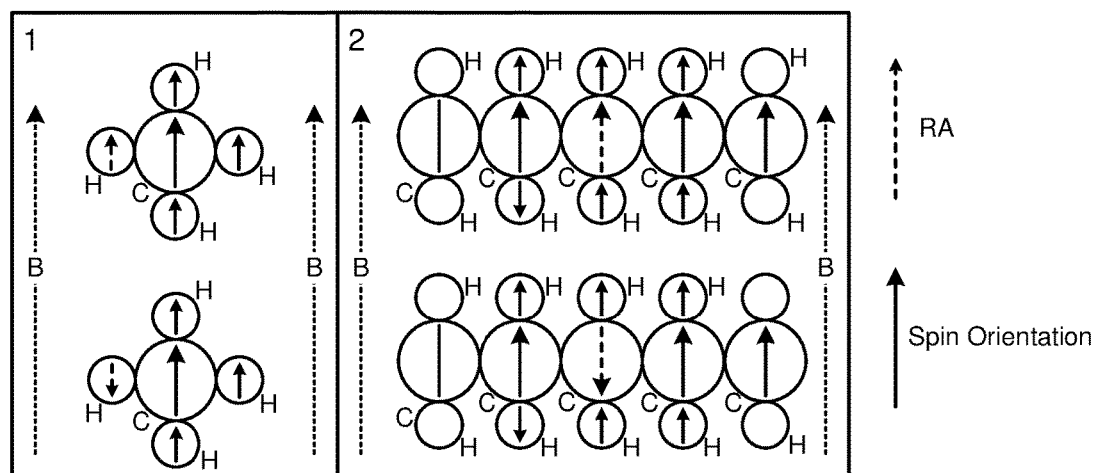
FIG. 11 is a table illustrating magnetic influence factors and other information for various molecules of minerals, according to various embodiments.
FIG. 12 is a diagram illustrating spin orientations for two molecules, according to various embodiments.

FIG. 11 is a table illustrating magnetic influence factors and other information for various configurations of molecules of oil and quartz (silicon dioxide). The MIF values in the table of FIG. 11 are intrinsic unique values for the given molecular structure and are independent of the measured magnetic field strength of the earth at any location. The values in the table for FIG. 11 are for a specific measured magnetic field strength of the earth at a particular location. Note that there the last two columns are MIF$_1$ and MIF$_2$ where the first column MIF$_1$ is for atoms adjacent to the resonant atom and the second column MIF$_2$ is for atoms that are two steps away from the resonant atom. Note that for oil, the MIF in both of the last two columns for hydrogen is 828.74 while the carbon atoms have different values for the first column MIF$_1$ and the second column MIF$_2$. Silicon dioxide does not have values in the second column MIF$_2$ because there are no atoms that are two steps from the resonant atom.

FIG. 12 is a diagram illustrating spin orientations for two molecules. The first diagram on the left is for a molecule of methane and includes a carbon atom surrounded by four hydrogen atoms. The hydrogen atom on the left in the first diagram is the resonant atom while the carbon atom and three other hydrogen atoms have a positive spin (arrows facing up). The formula for the summation of MIFs would be 3*H+CN where H is the MIF for hydrogen and CN is the MIF for a single step from the resonant atom (e.g., Carbon near). In an experiment, the measured magnetic field strength is 512.00 and a resonant frequency was found to be 17,073.8 Hz where hydrogen is the resonant atom. The MIF for hydrogen was found to be 828.74 mG and for carbon 13 was found to be 1,011.84 mG and applying the MIF summation formula of 3*H+CN results in 3*828.74 mG+1,011.84 mG=3,498.06 mG. Equation (2): (512.00 mG+3,498.06 mG)(4.25775 Hz/mG)=17,073.8 Hz, which is the determined resonant frequency.

For the second diagram of FIG. 12, the depicted hydrocarbon molecule includes five carbon atoms and 10 hydrogen atoms. The carbon atom on the left is a carbon 12 atom with no spin. The center carbon atom is the resonant atom. The hydrogen atoms on the left and right carbon atoms do not include an arrow or line because they are three steps away from the resonant carbon atom so their MIF is not included. The carbon atom second from the left has hydrogen atoms that have opposite spins. The resultant MIF formula is then 2CN+CD+4H. CN is for the carbon atoms next to the resonant carbon atom. CD is for the carbon atom on the right that is two steps from the resonant carbon atom. There are only 4 hydrogen MIFs included because two hydrogen atoms with opposite spin cancel each other. In an experiment, the measured magnetic field strength is 512.00 and a resonant frequency was found to be 7,255.1 Hz where carbon is the resonant atom. The MIF for hydrogen is again 828.74 mG, MIF$_1$ for carbon with carbon being the resonant atom is 989.78 mG and MIF$_2$ is 968.6 mG. Applying the MIF summation formula of 2CN+CD+4H results in 2*989.78 mG+968.6 mG+4*828.74 mG=6,263.12 mG. Equation (2) results in (512.00 mG+6,263.12 mG)(1.07084 Hz/mG)=7,255.1 Hz, which is the determined resonant frequency.

Figure 14:
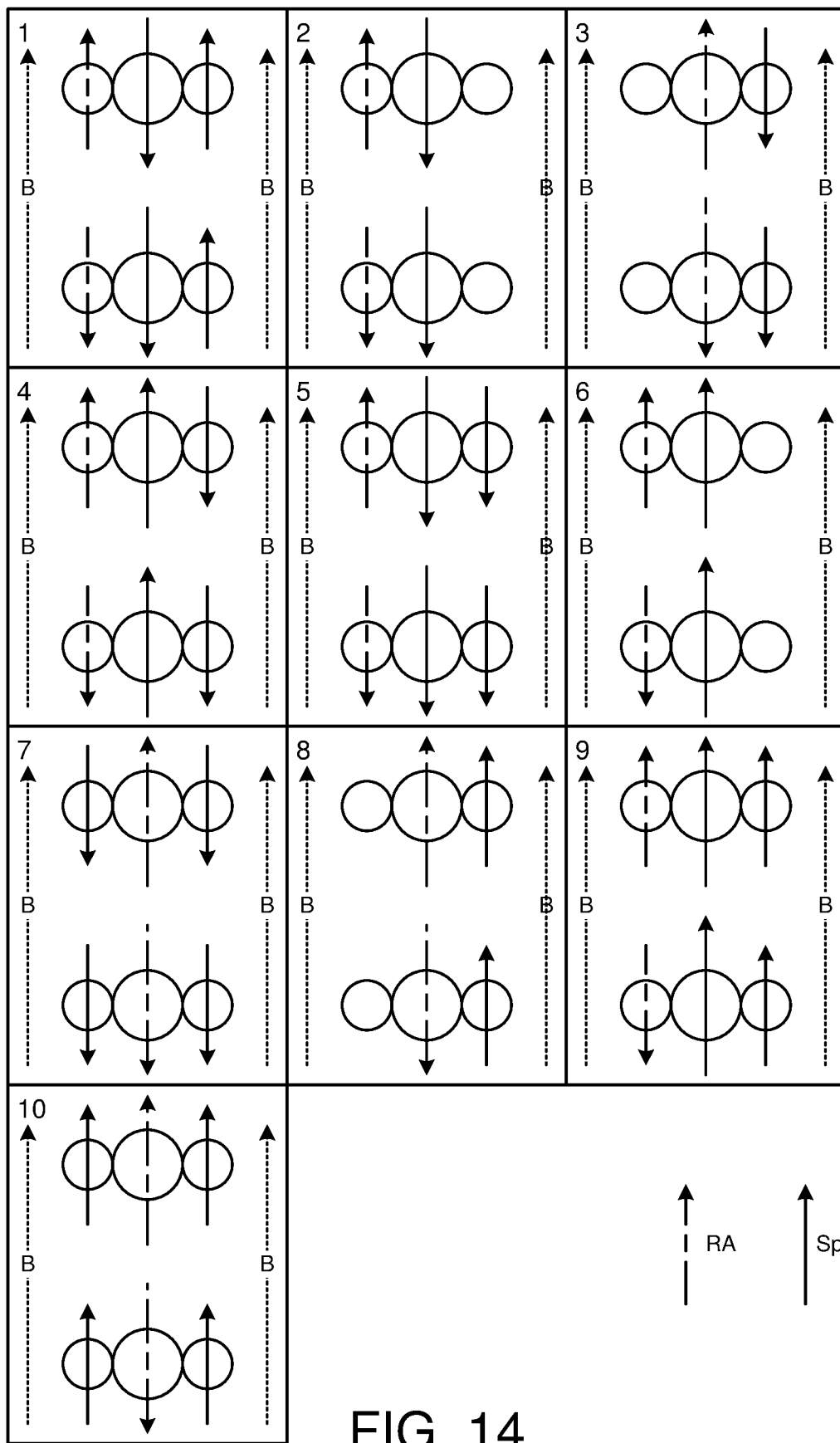
FIG. 14 is a schematic block diagram illustrating various combinations of magnetic spin of a resonant atom and related atoms for the table of FIG. 13, according to various embodiments.

FIG. 13 is a table illustrating magnetic influence factors and frequency information for various orientation options of silicon dioxide at B=524.0 mG. FIG. 14 is a schematic block diagram illustrating various combinations of magnetic spin of a resonant atom and related atoms for the table of FIG. 13. For the information in the top table, the measured magnetic field strength from the earth is 524.0 mG.

Line 1 of the top table in FIG. 13 has a resonant atom of oxygen and an MIF formula of —S+O. The first diagram of FIG. 14 has a negative spin for silicon (the larger circle) and a positive spin for the oxygen atom on the right where the left oxygen atom is the resonant atom. From the information in the top line of the top table in FIG. 13 along with the MIF information from the middle table in FIG. 13, equation (2) can be applied to verify the resonant frequency of the molecule in the top line. Applying the MIF formula of —S+O, the summed MIF is −1068.41 mG+937.60 mG=−130.81. Applying equation (2): |(524.0−130.81)(0.57742 Hz/mG)|=227.0 Hz. Each of the MIF equations of the top table in FIG. 13 is represented graphically in FIG. 14 where the row numbers in the top table of FIG. 13 are the same as the diagram numbers in FIG. 14.

The RV column of the top table in FIG. 13 is the atom specific, reflected velocity in feet per second. The reflected velocities of the RV column are used in the methods 500, 600 of FIGS. 5 and 6 to determine the depth of the top and bottom of the material. The RT/S column of the top table in FIG. 13 is the required relaxation time in seconds before rerunning a test at a location. Once a test is completed and the signal is turned off, the user must wait the amount of time in the RT/S column before starting another test. The P/V F/M column of the top table in FIG. 13 is the penetration time, in feet per second, of the material, which is dependent on the specific material and the thickness of the material.

The Larmor Precessional Frequency for each atom is a constant value. For a particular resonant atom of a molecule, the MIF is also constant so the resonant frequency changes with the measured magnetic field at the location where the locator apparatus 100 is used. In some embodiments, the controller 112 includes tables with MIFs, The Larmor Precessional Frequencies, MIF formulas, etc., such as the tables of FIG. 13 so that once the earth's magnetic field is measured at a location, the controller 112 is able to determine the available fundamental resonant frequencies.

In some embodiments, the locator apparatus 100 includes an electronic display and an input device to allow a user to select a sought for material and associated configuration, a measured value for the earth's magnetic field, to either set a resonant frequency to be used as the signal transmitted from the antenna or to be displayed to the user can set the resonant frequency for the signal. In other embodiments, a separate computing device with an electronic display and input means includes computer readable storage media with the Larmor Precessional Frequencies, MIF formulas, etc. and program code to allow the user to select a material, molecule configuration, to input the measured magnetic field strength at the location, etc. and the user inputs the resonant frequency in the signal generator 106.

The embodiments described herein advantageously provide a way to avoid drilling and other costly measures to locate materials in the earth. For example, the embodiments of the apparatuses described herein may be used to map out an oil field, to locate methane, propane, water, quartz, sand, or other material accurately and inexpensively.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:
1. A method comprising:
determining a current magnetic field strength at a test location above a quantity of material buried at the test location, wherein the current magnetic field strength at the test location is a current strength of the earth's magnetic field at the test location;
passing a direct current ("DC") through a coil of an antenna to induce a coil magnetic field in the antenna, the antenna comprising a rod and the coil wound around the rod, wherein a magnitude of the coil magnetic field strength is within a range comprising the determined magnetic field strength of the test location;
transmitting a test signal from the antenna positioned at or above a ground level at the test location, the test signal comprising a test fundamental frequency;
detecting, at the test location, a reflected wave comprising the test fundamental frequency on the antenna; and
varying the test fundamental frequency while retransmitting the test signal and detecting a reflected wave until reflected waves of various test frequencies are detected and identifying from the detected reflected waves a resonant frequency corresponding to a maximum magnitude of the detected reflected waves, wherein the material comprises molecules with a resonant atom and at least one atom different than the resonant atom, the resonant frequency derived from the current magnetic field strength.

2. The method of claim 1, wherein an equation for the resonant frequency is:

$$RF=|(B+\Sigma MIF)(L)|$$

wherein:
RF is the resonant frequency;
B is the magnetic field strength at the test location;
MIF is a magnetic influence factor between the different atom and the resonant atom; and
L is a Larmor Precessional Frequency of the resonant atom, and
further comprising determining the MIF between the different atom and the resonant atom using the equation for the resonant frequency.

3. The method of claim 1, wherein the resonant frequency corresponds to magnetic influence factor (MIF) between the different atom and the resonant atom of the molecule of the material, and further comprising calculating the MIF between the different atom and the resonant atom using the determined current magnetic field strength at the test location, a Larmor Precessional Frequency of the resonant atom, the resonant frequency corresponding to the maximum magnitude of the reflected wave, and a resonant frequency equation.

4. The method of claim 1, wherein the antenna comprises:
a DC current source configured to transmit the DC current in the coil, wherein a DC current in a direction in the coil induces the coil magnetic field in the antenna and a DC current in an opposite direction in the coil induces an opposite magnetic polarity of the coil magnetic field in the rod; and
a signal generator connected to the rod, the signal generator transmitting the test fundamental frequency to the rod,
wherein the rod is positioned horizontally while transmitting the test signal and detecting the reflected wave, and
wherein detecting the reflected wave comprises detecting a downward force on the rod.

5. The method of claim 4, wherein the coil magnetic field is a north coil magnetic field polarity and the opposite coil magnetic field is a south coil magnetic field polarity and wherein a magnitude of the DC current inducing the north coil magnetic field polarity is less than a magnitude of the DC current inducing the south coil magnetic field polarity.

6. The method of claim 5, wherein the rod is a brass rod and the coil comprises wire wrapped at about 475 turns and wherein the DC current inducing the north coil magnetic field polarity is in the range of 45-65 milliamperes ("mA") the DC current inducing the south coil magnetic field polarity is in the range of 75-95 mA.

7. The method of claim 4, wherein detecting the downward force comprises:
detecting the downward force on a strain gauge connected to the rod above a threshold; and/or detecting movement of the rod in a downward direction by detecting downward movement of the rod sufficient to overcome a spring force in an upward direction exerted by a spring mechanism supporting the rod.

8. The method of claim 7, wherein the rod is anchored at a first end of the rod at a hinge point and wherein a second end of the rod opposite the first end of the rod is anchored to the spring mechanism.

9. The method of claim 8, wherein the a first end of the spring mechanism is attached to the rod and a second end of the spring mechanism opposite the first end of the spring mechanism is attached to an anchor point, wherein the spring mechanism is angled with respect to the rod positioned horizontally, wherein the angle a the spring force of the spring mechanism are arranged to have a breakover point where a downward force due to the reflected wave is a force above a threshold causing the rod to move downward past the breakover point.

10. The method of claim 1, further comprising, from a location different from the test location:
   transmitting a signal from the antenna at the location, the signal comprising a fundamental frequency, the signal penetrating ground under the location, the location being selected to locate the material at a depth under the location, and the fundamental frequency matching the resonant frequency of the resonant atom of the molecule of the material;
   detecting a reflected wave on the antenna;
   determining a time difference between transmission of the signal and detection of the reflected wave on the antenna; and
   determining the depth to the material based on the time difference and a reflected velocity corresponding to the material.

11. The method of claim 10, wherein the antenna is a first antenna set to a coil magnetic field polarity, the signal from the first antenna is a first signal, the time difference is a first time difference, and further comprising, while transmitting the first signal by the first antenna:
   transmitting a second signal from a second antenna located a distance from the first antenna, the second signal comprising the fundamental frequency, the second antenna set to an opposite magnetic polarity of the coil magnetic field as the coil magnetic field polarity of the first antenna;
   detecting a reflected wave on the second antenna;
   repeating, at varying distances from the first antenna, transmitting the second signal and detecting a reflected wave on the second signal to find an edge location where a reflected wave is not detected by the second antenna;
   transmitting the second signal from the second antenna at a signal detection location between the first antenna and the edge detection location and close to the edge detection location;
   detecting a reflected wave on the second antenna at the signal detection location;
   determining a second time difference between transmission of the second signal and detection of the reflected wave on the second antenna;
   calculating a first/second time difference between the first time difference and the second time difference; and
   determining a thickness of the material based on the first/second time difference and the reflected velocity corresponding to the material.

12. The method of claim 1, further comprising adjusting the coil magnetic field strength of the antenna to match the determined earth magnetic field strength by adjusting the DC current of the antenna prior to transmitting the test signal.

13. The method of claim 12, wherein determining the magnetic field strength at the test location comprises:
   measuring the magnetic field strength at the test location; and/or
   determining the magnetic field strength from a source that publishes the magnetic field strength for geographic locations.

14. The method of claim 12, wherein adjusting the coil magnetic field strength comprises adjusting the coil magnetic field within a range of 450 milli-gauss ("mG") to 550 mG.

15. An apparatus comprising:
   a magnetometer configured to determine a current magnetic field strength at a test location above a quantity of material buried at the test location, wherein the current magnetic field strength at the test location is a current strength of the earth's magnetic field at the test location;
   a direct current ("DC") source;
   an antenna comprising a rod and a coil wrapped around the rod, wherein a DC current from the DC source transmitted through the coil induces a coil magnetic field in the antenna, wherein a magnitude of the coil magnetic field strength is within a range comprising the determined current magnetic field strength of the test location;
   a transmission circuit configured to transmit a test signal from the antenna, wherein the antenna is positioned at or above a ground level at the test location, the test signal comprising a test fundamental frequency;
   a wave detector configured to detect, at the test location, a reflected wave comprising the test fundamental frequency on the antenna; and
   a depth calculator configured to vary the test fundamental frequency while the transmission circuit retransmits the test signal and the wave detector detects a reflected wave until reflected waves of various test frequencies are detected and a resonant frequency calculator is configured to identify from the detected reflected waves a resonant frequency corresponding to a maximum magnitude of the detected reflected waves, wherein the material comprises molecules with a resonant atom and at least one atom different than the resonant atom, the resonant frequency derived from the current magnetic field strength.

16. The apparatus of claim 15, wherein an equation for the resonant frequency is:

$$RF=|(B+MIF)(L)|$$

wherein:
   RF is the resonant frequency;
   B is the magnetic field strength at the test location;
   MIF is a magnetic influence factor between the different atom and the resonant atom; and
   L is a Larmor Precessional Frequency of the resonant atom, and
   further comprising determining the MIF between the different atom and the resonant atom using the equation for the resonant frequency.

17. The apparatus of claim 15, wherein the antenna comprises:
   a signal generator connected to the rod, the signal generator transmitting the test fundamental frequency to the rod,
   wherein the DC source is configured to transmit the DC current in the coil, wherein DC current in the coil in a direction induces the coil magnetic field in the antenna and DC current in an opposite direction in the coil induces an opposite magnetic polarity of the coil magnetic field in the rod,
   wherein the rod is positioned horizontally while transmitting the test signal and detecting the reflected wave, and
   wherein detecting the reflected wave comprises detecting a downward force on the rod.

18. The apparatus of claim 17, wherein detecting the downward force comprises:
- detecting the downward force on a strain gauge connected to the rod above a threshold; and/or
- detecting movement of the rod in a downward direction by detecting downward movement of the rod sufficient to overcome a spring force in an upward direction exerted by a spring mechanism supporting the rod.

19. The apparatus of claim 18, wherein the rod is anchored at a first end of the rod at a hinge point and wherein a second end of the rod opposite the first end of the rod is anchored to the spring mechanism, and wherein the a first end of the spring mechanism is attached to the rod and a second end of the spring mechanism opposite the first end of the spring mechanism is attached to an anchor point, wherein the spring mechanism is angled with respect to the rod positioned horizontally, wherein the angle a the spring force of the spring mechanism are arranged to have a breakover point where a downward force due to the reflected wave is a force above a threshold causing the rod to move downward past the breakover point.

20. The apparatus of claim 15, further comprising, from a location different from the test location:
- the transmission circuit is configured to transmit a signal from the antenna at the location, the signal comprising a fundamental frequency, the signal penetrating ground under the location, the location being selected to locate a separate quantity of the material at a depth under the location, and the fundamental frequency matching the resonant frequency of the resonant atom of the molecule of the material;
- the wave detector is configured to detect a reflected wave on the antenna;
- a timer configured to determine a time difference between transmission of the signal and detection of the reflected wave on the antenna; and
- the depth calculator is configured to determine the depth to the material based on the time difference and a reflected velocity corresponding to the separate quantity of the material.

21. The apparatus of claim 15, further comprising adjusting the coil magnetic field strength of the antenna to match the determined earth magnetic field strength by adjusting the DC current of the antenna prior to transmitting the test signal.

22. The apparatus of claim 21, wherein determining the magnetic field strength at the test location comprises:
- measuring the magnetic field strength at the test location; and/or
- determining the magnetic field strength from a source that publishes the magnetic field strength for geographic locations,
- wherein adjusting the coil magnetic field strength comprises adjusting the coil magnetic field within a range of 450 milli-gauss ("mG") to 550 mG.

* * * * *